US012694344B2

(12) United States Patent
    Liu et al.

(10) Patent No.: US 12,694,344 B2
(45) Date of Patent: Jul. 28, 2026

(54) FRAMEWORK FOR MACHINE-LEARNING MODEL SEGMENTATION

(71) Applicant: Oracle International Corporation, Redwood Shores, CA (US)

(72) Inventors: Chunming Liu, Seattle, WA (US); Margaret Elizabeth Whorf, Kirkland, WA (US)

(73) Assignee: Orcacle International Corporation, Redwood Shores, CA (US)

( * ) Notice: Subject to any disclaimer, the term of this patent is extended or adjusted under 35 U.S.C. 154(b) by 1019 days.

(21) Appl. No.: 17/684,602

(22) Filed: Mar. 2, 2022

(65) Prior Publication Data

US 2022/0405650 A1      Dec. 22, 2022

Related U.S. Application Data

(60) Provisional application No. 63/213,206, filed on Jun. 21, 2021.

(51) Int. Cl.
    *G06N 20/20*      (2019.01)
    *G06F 18/21*      (2023.01)
    *G06F 18/214*     (2023.01)
(52) U.S. Cl.
    CPC ........... *G06N 20/20* (2019.01); *G06F 18/214* (2023.01); *G06F 18/2163* (2023.01); *G06F 18/217* (2023.01)

(58) Field of Classification Search
    CPC ... G06N 20/20; G06F 18/217; G06F 18/2163; G06F 18/214
    USPC .......................................................... 706/12
    See application file for complete search history.

(56) References Cited

U.S. PATENT DOCUMENTS

| | | | |
|---|---|---|---|
| 2021/0117583 A1* | 4/2021 | Strong ...................... | G06T 7/10 |
| 2021/0201128 A1* | 7/2021 | Xu ............................ | G06N 3/08 |
| 2022/0058437 A1* | 2/2022 | Soni ...................... | G06F 18/214 |

OTHER PUBLICATIONS

Albert et al., "Deep learning from limited training data: novel segmentation and ensemble algorithms applied to automatic melanoma diagnosis", IEEE Access, vol. 8, 2000 (Year: 2000).*

* cited by examiner

*Primary Examiner* — Tsu-Chang Lee

(74) *Attorney, Agent, or Firm* — Kilpatrick Townsend & Stockton, LLP

(57) ABSTRACT

The present disclosure describes techniques for, in addition to a "global model" that is trained using training data, training one or more "segmented" machine learning (ML) models using subsets or segments of the training data, wherein a segmented ML model is trained using a segment or subset of the training data that satisfies a particular condition. Both the trained global model, and where applicable, one or more trained segmented models are used to make predictions in a production environment.

20 Claims, 13 Drawing Sheets

Figure 3:
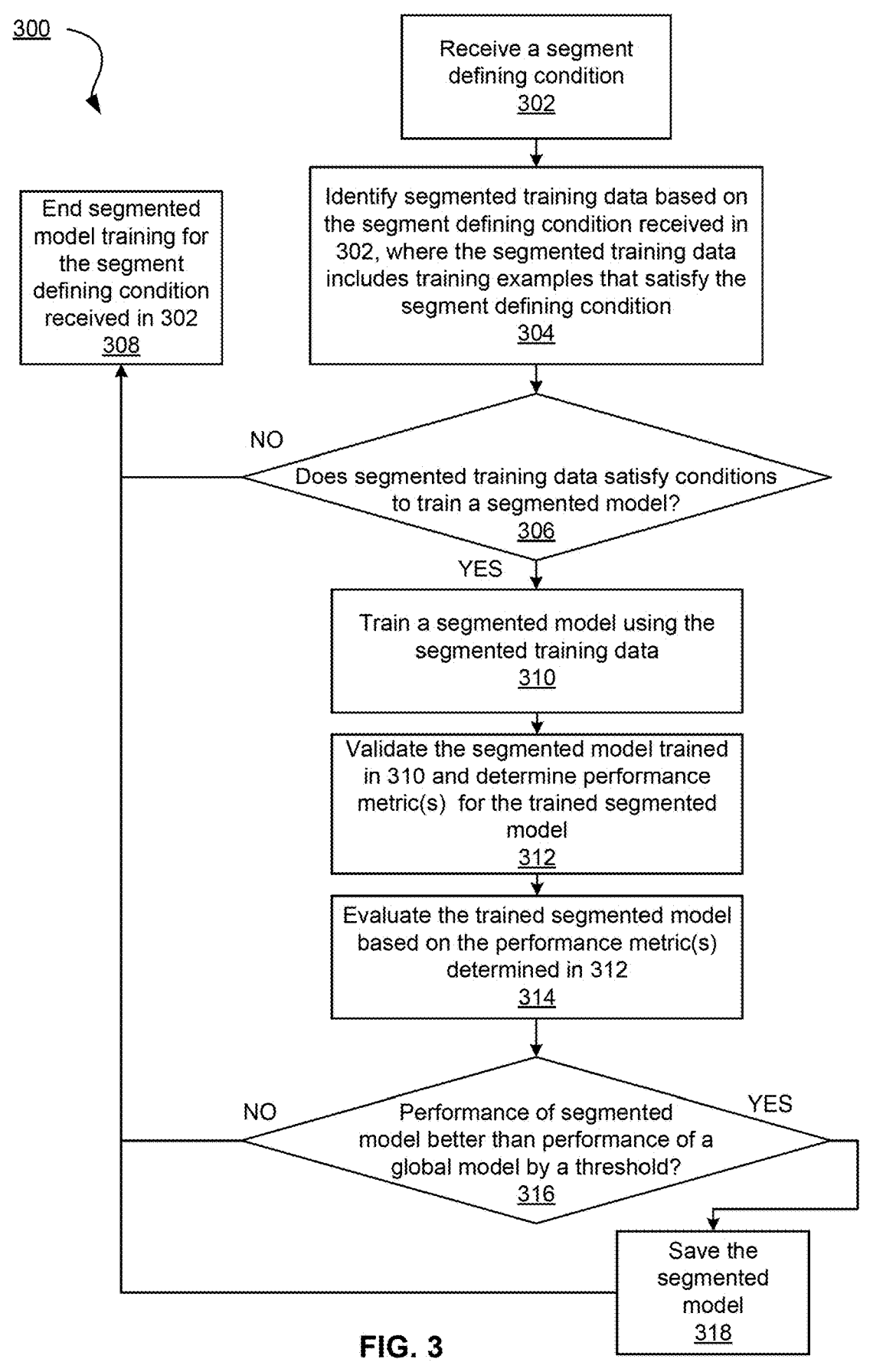

300

```
                        ┌─────────────────────┐
                        │  Receive a segment  │
                        │ defining condition  │
                        │         302         │
                        └─────────────────────┘
                                  │
                                  ▼
┌──────────────────┐   ┌──────────────────────────────┐
│ End segmented    │   │ Identify segmented training   │
│ model training   │   │ data based on the segment     │
│ for the segment  │   │ defining condition received   │
│ defining         │   │ in 302, where the segmented   │
│ condition        │   │ training data includes        │
│ received in 302  │   │ training examples that satisfy│
│       308        │   │ the segment defining condition│
└──────────────────┘   │            304                │
                       └──────────────────────────────┘
```

Receive a segment defining condition 302

Identify segmented training data based on the segment defining condition received in 302, where the segmented training data includes training examples that satisfy the segment defining condition 304

End segmented model training for the segment defining condition received in 302 308

Does segmented training data satisfy conditions to train a segmented model? 306

NO

YES

Train a segmented model using the segmented training data 310

Validate the segmented model trained in 310 and determine performance metric(s) for the trained segmented model 312

Evaluate the trained segmented model based on the performance metric(s) determined in 312 314

Performance of segmented model better than performance of a global model by a threshold? 316

NO

YES

Save the segmented model 318

From 304 # of training examples in the segmented training data > Min training examples number threshold
306A NO → To 308

YES

Number of training samples (in the segmented training data) with a particular label > Label threshold
306B NO → To 308

YES

FRAMEWORK FOR MACHINE-LEARNING MODEL SEGMENTATION

CROSS-REFERENCES TO RELATED APPLICATIONS

This application is a non-provisional of and claims the benefit of the filing date of U.S. Provisional Application No. 63/213,206, filed on Jun. 21, 2021, the contents of which are incorporated herein by reference in its entirety for all purposes.

FIELD

The present disclosure relates generally to training and using machine-learning (ML) models for making predictions. More particularly, the present disclosure describes techniques for, in addition to a "global model" that is trained using training data, training one or more "segmented" ML models using subsets or segments of the training data, where a segmented ML model is trained using a segment or subset of the training data that satisfies a training criteria. Both the global model and one or more segmented models are utilized to make predictions in a production environment. An automated pipeline is described for automatically identifying segments of training data, training and validating segmented models using the training data segments, and then evaluating the performance of the segmented models to determine if the models are to be stored. Additionally, techniques are described for deploying the global model and the one or more segmented models to the production environment, and using these models in production for making predictions that are more accurate.

BACKGROUND

Supervised machine-learning solutions typically involve two phases—(i) a training phase during which a machine learning (ML) model is built and trained using training data, and (ii) a production phase in which the trained model is used to make predictions on live data inputs, which are typically different from the training data inputs. Based upon the size of the training data, which usually is quite extensive, and the type of model being trained, it can take a long time to train a model until the model achieves a certain threshold of accuracy. This could be multiple hours, or even days.

Additionally, because the data in the production environment can be very different from the training data, a model that performs well in the training environment may not perform as well in the production environment, possibly leading to bad and unwanted outcomes. This is especially pronounced in fields where the nature of the data is dynamic and keeps changing (e.g., in the field of fraud detection, where fraudsters are constantly evolving and changing their ways so as to evade fraud detection). Accordingly, data scientists and ML model builders are constantly looking for ways to build better ML models faster. Embodiments described herein address these and other problems, individually and collectively.

SUMMARY

The present disclosure relates to training and using machine-learning (ML) models for making predictions. More particularly, the present disclosure describes techniques for, in addition to a "global model" that is trained using training data, training one or more "segmented" ML models using subsets or segments of the training data, wherein a segmented ML model is trained using a segment or subset of the training data that satisfies a particular condition. Both the trained global model, and where applicable, one or more trained segmented models are used to make predictions in a production environment. Various embodiments are described herein, including methods, systems, non-transitory computer-readable storage media storing programs, code, or instructions executable by one or more processors, and the like.

In certain embodiments, an automated pipeline is described for automatically identifying segments of training data, training and validating segmented models using the training data segments, and then evaluating the performance of the segmented models to determine if the segmented models are to be stored. In certain implementations, the evaluation of the segmented models is done with respect to the performance of the global model. Additionally, techniques are described for deploying the global model and the one or more segmented models to the production environment, and using these models in the production for making predictions that are more accurate.

In certain embodiments, techniques are described for, in addition to a trained global model produced from training a global model using training data, generating a trained segmented model by training a segmented model using a segment of the training data, wherein only those one or more training examples in the training data that meet a condition are included in the segment of the training data. In certain instances, the number of training examples in the segment of the training data is less than the number of training examples in the training data. The trained segmented model may be stored upon determining that performance of the trained segmented model is better than performance of the trained global model.

The trained global and the trained segmented model may then be used to make predictions in the production environment. For example, for an input, a first prediction may be made using the trained global model and a second prediction may be made using the trained segmented model. Both predictions may then be output to a user.

In some embodiments, for an input, a first prediction is made using the trained global model, and, upon determining that the trained segmented model is applicable to the input, a second prediction is made using the trained segmented model. Both predictions may then be output to a user.

In certain implementations, generating the trained segmented model comprises processing including: generating a first version of the trained segmented model using the segment of the training data and a first set of hyperparameters, generating a second version of the trained segmented model using the segment of the training data and a second set of hyperparameters, wherein the second set of hyperparameters is different from the first set of hyperparameters, and upon determining that performance of the first version of the trained segmented model is better than performance of the second version of the trained segmented model, using the first version of the trained segmented model as the trained segmented model.

Different types of conditions may be used for defining segments. For example, the condition may specify a first value for a first attribute (or feature) of the training data. As another example, a condition may specify a first value for a first attribute of the training data and a second value for a second attribute of the training data. In certain embodiments, the conditions may be configured automatically. For example, a set of attributes and associated attribute values in the training data may be determined by introspecting the training data. One of more conditions may then be configured based upon the set of attributes and the associated attribute values. For example, various combinations of the attributes and their values may be used to generate different conditions.

In certain embodiments, multiple segmented models may be generated, The processing may include, for example, generating a first trained segmented model using a first subset of training data used to train a global model, wherein only those one or more training examples in the training data that meet a first condition are included in the first subset, and generating a second trained segmented model using a second subset of the training data used to train the global model, wherein only those one or more training examples in the training data that meet a second condition are included in the second subset, wherein the first condition is different from the second condition and the first subset is different from the second subset. In situations where multiple trained segmented models, in addition to the trained global model, are available, for an input, a first prediction may be made using the trained global model. Upon determining that the first trained segmented model is applicable to the input, a second prediction may be made using the first trained segmented model. It may be determined that the second trained segmented model is not applicable to the input, and thus is not used for making any predictions for the input.

An aspect of the present disclosure provides for a method comprising: for a segment-defining condition based on one or more features associated with a training dataset, identifying a subset of the training dataset that satisfies the segment-defining condition, wherein a number of training samples included in the subset of the training data set is less than the number of training samples included in the training dataset; training a machine-learning model using the subset of the training dataset to generate a trained segmented machine-learning model; evaluating a performance of the trained segmented machine-learning model with respect to a trained global machine learning model that is trained based on the training dataset; and using the trained segmented machine-learning model for making predictions with respect to real-time data based on the evaluating.

Another aspect of the present disclosure provides for a method comprising: receiving production data for which a prediction is to be made; applying a trained global machine learning model to obtain a first prediction; determining, whether a trained segmented machine-learning model can be applied to the production data; responsive to successfully determining that the trained segmented machine-learning model can be applied to the production data, applying the trained segmented machine-learning model to obtain a second prediction; and outputting both the first prediction and the second prediction in response to receiving the production data.

An aspect of the present disclosure provides for a system comprising one or more data processors, and a non-transitory computer readable storage medium containing instructions which, when executed on the one or more data processors, cause the one or more data processors to perform part or all of one or more methods disclosed herein.

Another aspect of the present disclosure provides for a computer-program product tangibly embodied in a non-transitory machine-readable storage medium, including instructions configured to cause one or more data processors to perform part or all of one or more methods disclosed herein.

The foregoing, together with other features and embodiments will become more apparent upon referring to the following specification, claims, and accompanying drawings.

BRIEF DESCRIPTION OF THE DRAWINGS

The specification makes reference to the following appended figures, in which use of like reference numerals in different figures is intended to illustrate like or analogous components.

FIG. 3 is a flowchart illustrating a process for training a segmented model using segmented training data according to certain embodiments.

FIG. 9 is a block diagram illustrating another pattern for implementing a cloud infrastructure as a service system, according to at least one embodiment.

DETAILED DESCRIPTION

Figure 1:
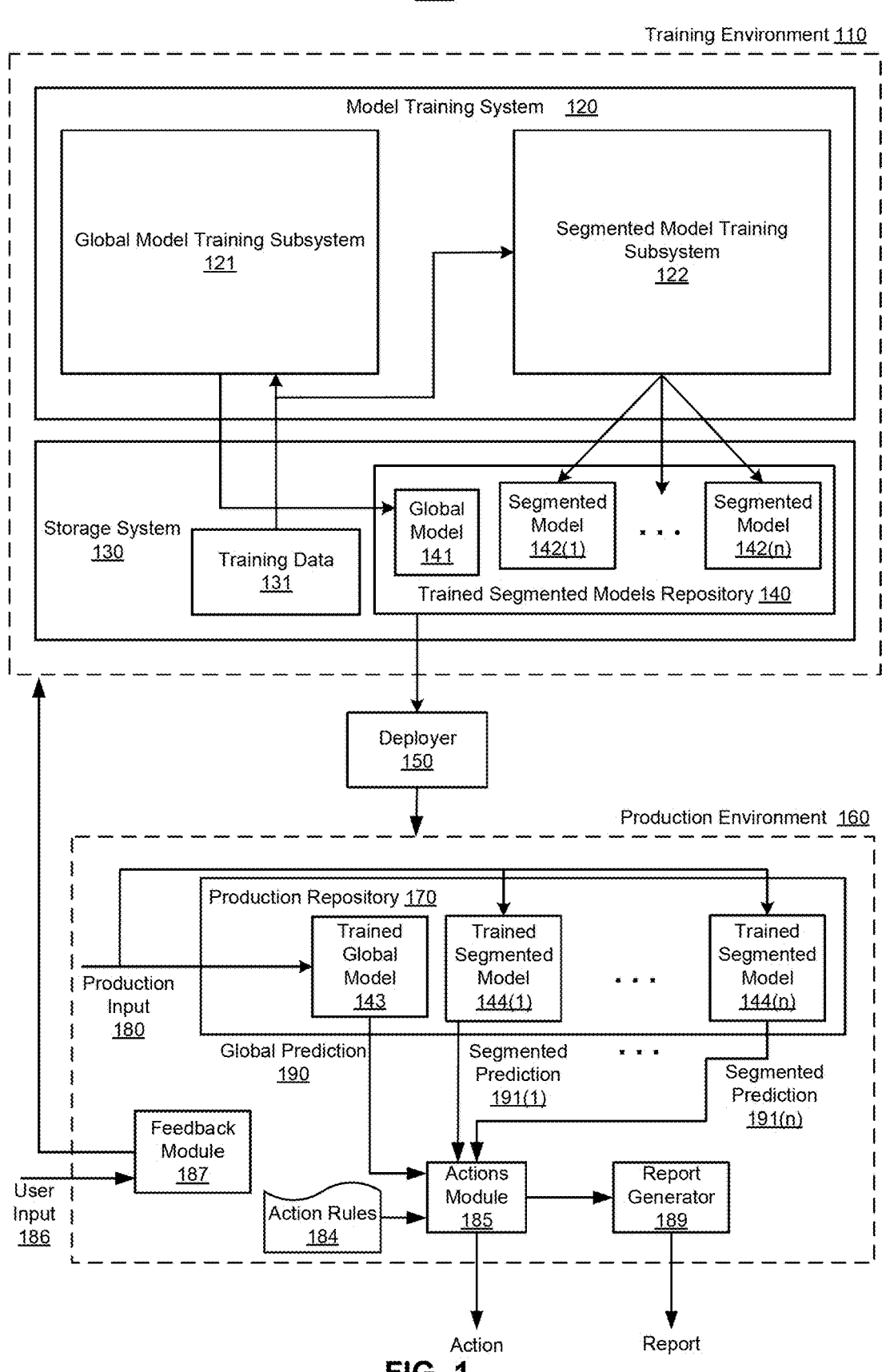
FIG. 1 is a simplified diagram of a distributed environment incorporating a model training system according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates generally to training and using machine-learning (ML) models for making predictions. More particularly, the present disclosure describes techniques for, in addition to a "global model" that is trained using training data, training one or more "segmented" ML models using subsets or segments of the training data, wherein a segmented ML model is trained using a segment or subset of the training data that satisfies a particular condition. Both the trained global model, and where applicable, one or more trained segmented models are used to make predictions in a production environment. Various embodiments are described herein, including methods, systems, non-transitory computer-readable storage media storing programs, code, or instructions executable by one or more processors, and the like.

The global model is trained using the training data, where the training data comprises a set of training examples (i.e., training samples). Each training example may be of the form (x, y), where "x" is a set of input attributes (features), and "y" is the expected output/target variable for the "x" input attributes. For example, for training data that is used to train a machine-learning model to detect fraud and output whether certain activity (represented by the inputs) is fraudulent or not fraudulent, the "x" may be a multi-dimensional vector of attributes related to the activity, and the "y" may be a label indicating "fraudulent" or "not fraudulent", which represents the ground truth for that activity. The global model is trained using training data that comprises the training examples.

In certain embodiments, a segmented model is trained using a subset or segment of the training data that was used to train the global model. For example, assuming that the global model is trained using a training data set containing "m" training examples, then, a segmented model is trained using a training data set containing "n" training examples, where "n" is less than "m" (i.e., n<m). A segment may be defined using a segment defining condition, where the condition is based upon values of one or more attributes in the training data. For a particular segment defining condition, the segmented training data for that segment includes all training examples from the training data that satisfy that condition. The number of training examples in the segmented training data is generally less than the number of training examples in the overall training data since one or more training examples in the overall training data that do not meet the condition are not included in the training data segment for that segment. A segmented model for that segment is then trained using the segmented training data for that segment. An automated pipeline is provided for identifying the training data segments and training the segmented models using the segments.

Different segmentation techniques may be used for segmenting a training data into segments, which are then used for training the segmented models. In certain implementations, each segment is defined using a segment condition, where the segment condition is based upon one or more attributes of the training data. For a particular segment condition, the training data segment or subset for the condition contains all training examples that meet the condition, and the training data segment is then used to train a segmented model for that condition. In this manner, different segment conditions may be used to define different segments of the training data, with the training data segments being used to train segmented models corresponding to the different segments.

For example, for training data comprising attributes including a "City Name" and a "Country," a segment condition may be specified as follows:

Segment #1 Condition: "Where City=San Francisco".
Given this condition, the corresponding training data segment contains all training examples from the training data where the value of the "City" attribute is San Francisco. This training data segment may then be used to train a segmented model that is specialized for making predictions for data involving San Francisco. As another example, another segment condition may be specific as follows:

Segment #2 Condition: "Where City=Moscow and Country=Russia."
Given this condition, the corresponding training data segment contains all training examples where the value of the "City" attribute is Moscow and the value of the "Country" attribute is Russia. This training data segment may then be used to train a segmented model that is specialized for making predictions for data related to Moscow in Russia. Given such segments conditions, the training data segments are automatically determined and the corresponding segmented models automatically trained using the training data segments.

In yet other implementations, the conditions to be used for segmenting the training data may be automatically determined based upon the attributes present within the training data. For example, the training data may be a dataset comprising training sets of data, each training set of data corresponding to one or more attributes as described above. An automated system may parse training data to sort segments of the training data according to segment attributes. For example, training data may comprise one or more potential segments, each segment associated with at least one attribute (i.e. a city in which the training data was generated). An automated pipeline may automatically identify potential segments within the incoming information and group sets of data from the training data according to attributes to form segments of training data. For example, training data generated in the state of California may comprise a plurality of training examples, each training example associated with an attribute corresponding to a city in California in which the training example was generated. An automated pipeline may then automatically transform the training data into a plurality of segmented training sets of data, each segmented training set of data associated with a particular city in California in which the data was generated (i.e. a segmented training set of data for "Los Angeles," for "San Francisco," for "San Diego," etc.). These automatically generated segments of training data may be stored in a training repository and/or used to train a plurality of segmented models.

Each generated segmented model (SM) may be independently evaluated against the performance of a global model (GM). For example, an evaluation dataset may be input to both a global model (GM) and an SM to generate output predictions. Output predictions specify a rate at which a model predicts a correct ground truth associated with the evaluation dataset. SMs that output predictions at a lower success rate than the GM may be discarded, modified, or otherwise repurposed. For example, known fraudulent evaluation data from a particular region may be input to both a GM and a particular SM that was trained using segmented training data having a segment attribute corresponding to the particular region. For example, known fraudulent test data from a particular popular e-mail application may be input to both a GM and a SM trained using segmented data generated from the particular popular e-mail application. If the SM outputs predictions at a lower rate of success than the GM, the SM may be discarded or repurposed into a different SM (i.e. the SM may be further trained using segmented training data having a segmented attribute corresponding to the particular popular email-application and also only having a segmented attribute corresponding to a particular written language). If the SM outputs predictions from the evaluation dataset at a greater rate of success than the GM, the SM may sent to a production environment for further utilization.

SMs may be used to supplement a GM operating within a production environment. For example, incoming production input data may be input to a GM to generate predictions as output. The GM may predict aspects (i.e. artificial labels) of the input based on a sought objective (i.e. fraud detection). The GM may output one or more global predictions. The one or more global predictions may be compared to a threshold of prediction confidence. If global predictions comport with the threshold of prediction confidence, the predictions may be passed on to a user. If the global predictions do not comport with the predetermined metric, the input may be sent to one or more SMs for further production processing.

For example, incoming production input data may be input to a GM. The GM may output a number of predictions according to an objective, such as a determination of whether a number of datasets within the incoming production input data are fraudulent. The output global predictions may exceed a prediction threshold corresponding to an acceptable probability of fraud (i.e. if a GM predicts fraud 95% of the time in a typical data stream, it likely does not predict fraud efficiently for input data of similar formats). The incoming production input data may then be further routed to and input into one or more SMs. Particularly SMs trained using segmented attributes detected in the incoming production input data may be routed to specifically. For example if a majority of datasets from the incoming production input data correspond to a particular region in which the data was generated, the incoming production input data may be input to a SM trained using segmented training data corresponding to the same particular region as a data attribute. The SM may then output segmented predictions comprising artificial labels corresponding to objective determinations, such as a determination of whether a number of datasets within the incoming production input data are fraudulent. SM may supplement the use of a GM in the manner to generate more accurate predictions when the GM is not well-trained with regard to a particular attribute. In various embodiments, the GM and SM predictions may be output concurrently and view by a user to determine the relative functionality of both models.

The segmentation, training, testing, evaluations and predictions occur automatically and according to predefined parameters of operation by an automated pipeline. For example, a training entity may specify a level of segmentation and training that should be performed during ML training operations. For example, a system may receive a segmentation threshold which describes a total or proportional number of segmentation models which should be trained using a training dataset. The system may then automatically segment training data and train a number of SMs according to those parameters/threshold. One having ordinary skill in the art will appreciate how these approaches may be extended to data testing and evaluation as well.

FIG. 1 is a simplified diagram of a distributed environment 100 incorporating a model training system 120 according to certain embodiments. As shown in FIG. 1, distributed environment 100 comprises training environment 110 and production environment 160. Distributed environment 100 depicted in FIG. 1 is merely an example and is not intended to unduly limit the scope of claimed embodiments. Many variations, alternatives, and modifications are possible. For example, in some implementations, distributed environment 100 may have more or fewer systems than those shown in FIG. 1, may combine two or more systems, or may have a different configuration or arrangement of systems.

Training environment 110 implements various components that enable efficient ML model training for global model (GM) and segmented models (SM) using training data. For example, training environment 110 comprises a model training system 120. The model training system 120 facilitates training for ML models using training data stored in a storage system 130. Storage system 130 may store the training data that the model training system 120 uses to train the ML models, as well as the actual models in a model repository 140. For example, as depicted in FIG. 1, model repository 140 comprises at least a global model 141 and several segmented models 142(1)-142(n).

Model training system 120 may train both GM as well as SMs. Global model training subsystem 121 may be a subsystem of model training system 120 that is configured to create and/or train GM using training data 131 from storage system 130. Model training system 120 further comprises segmented model training subsystem 122 that is configured to create and/or train SMs using training data 131 from storage system 130.

As shown in FIG. 1, distributed environment 100 comprises deployer 150. Deployer 150 may be a "bridge" system for facilitating communication and data transfer between training environment 110 and production environment 160. Deployer 150 enables trained models from trained segmented models repository 140 to be deployed to production environment 160 for use as part of a production service.

Production environment 160 may comprise a production repository 170 storing a trained GM and a number of trained SMs for use in a prediction service. For example, as depicted in FIG. 1, production repository 170 comprises a trained global model 143 and a plurality of trained segmented models 144(1)-144(n). Production environment 160 may be configured to receive production input from a production service (i.e., a professional machine-learning-assisted commercial service) to cause generation of prediction data using the GM and SMs stored therein. For example, production input 180 is input to trained ML models such as trained global model 143 and trained segmented models 144(1)-144(n) to generate one or more prediction outputs. The prediction data may indicate predicted objective determinations/labels (e.g. categories such as fraudulent/non-fraudulent, etc.) corresponding to predictions generated by the models. For example, trained global model 143 may receive production input 180 and generate output comprising global prediction data 190. Each of trained segmented models 144(1)-144(n) may receive production input 180 and generate output comprising segmented prediction data 191(1)-191(n).

The global prediction data 190 as well as the outputs (i.e., 191(1)-191(n)) from the trained segmented models 144(1)-144(n) are input to an actions module 185. By some embodiments, the actions module 185 determines a final prediction of the production environment 160 in accordance with a set of action rules 184. For instance, assume a fraud detection application, where a risk threshold is set at 90%. In this case, by one implementation, one of the action rules 184 may correspond to determining whether one of the prediction outputs i.e., the prediction output of the global trained model 190, or one of prediction outputs of the segmented models i.e., outputs 191(1)-191(n) is above the risk threshold. In response to a successful determination, the actions module 185 may be configured to output as a positive fraud detected event. It is appreciated that in doing so, the prediction system may be more sensitive to detect fraud, while causing more number of false positive cases. In another implementation, the actions module 185 may be configured to determine the final prediction based on an ensemble voting mechanism. Specifically, if a majority (i.e., greater than 50%) of the predictions made by the trained GM and SMs is larger than the risk threshold (e.g., 90%), then the actions module 185 is configured to output a positive fraud detected event. It is appreciated that in doing so, the prediction system may be more conservative in fraud detection, while having a lower number of false positive cases. Furthermore, the actions module 185 may be configured to trigger a report generator 189, which generates a prediction report (including the one or more predictions) to be presented to a user e.g., system administrator.

By some embodiments, the production environment 160 includes a feedback module 187, which may be utilized to augment training data 131 in the training environment 110. For instance, in a scenario where the predictions made by the GM and SMs are disparate, the corresponding production input data (as well as the predictions made by the respective models) may be passed to a feedback module for further investigation by a system personnel e.g., administrator. Upon investigating, for example, the system personnel may trigger (via input 186) the feedback module 187 to cause the production input data corresponding to the event under consideration to be fed back to the training environment in order to augment training data 131. In doing so, as the training environment 110 receives feedback from the production environment 160, a training capability of the subsystems 121 and 122 is enhanced.

Figure 2:
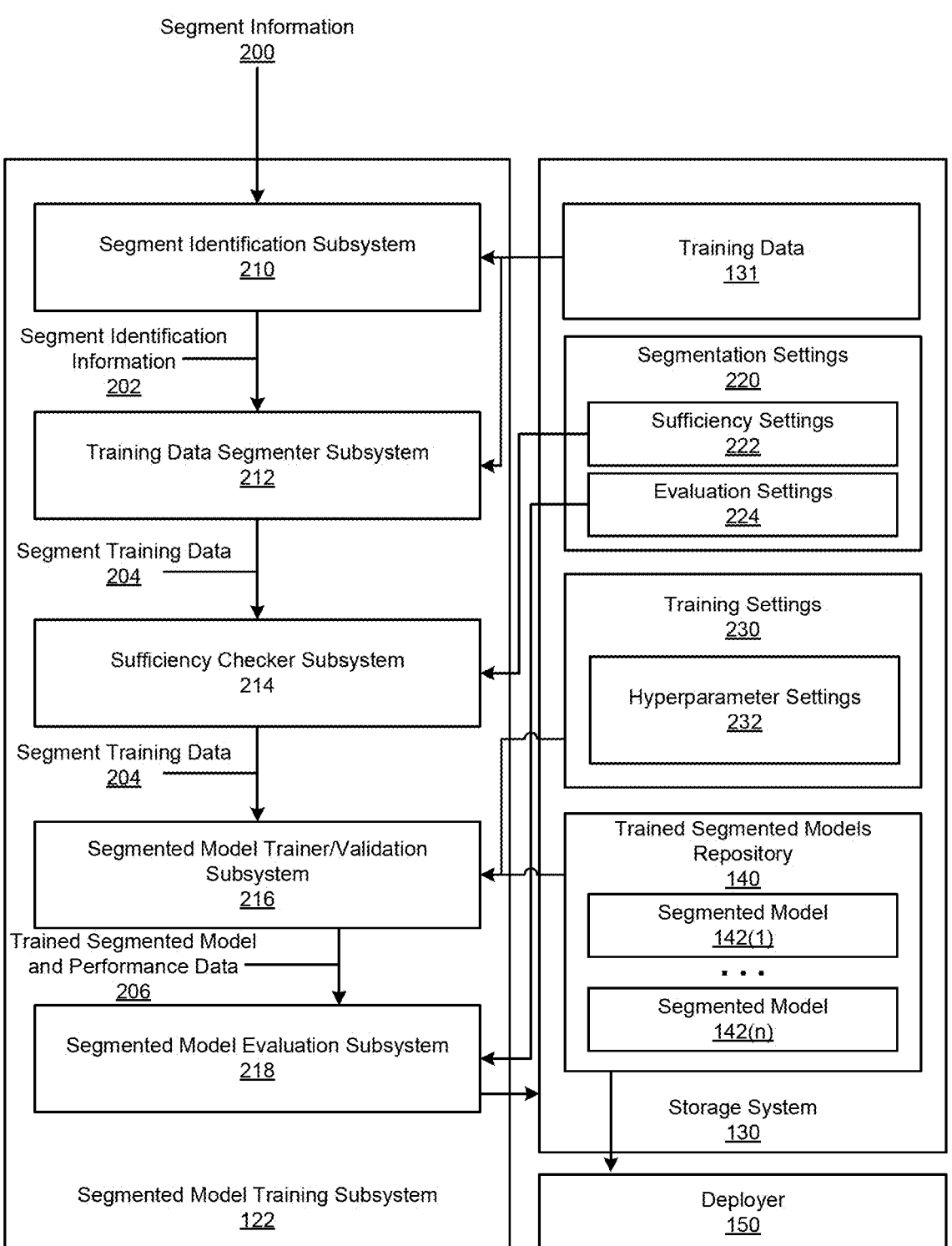
FIG. 2 is a simplified diagram of segmented model training subsystem according to certain embodiments.

FIG. 2 is a simplified diagram of segmented model training subsystem 122 depicted in FIG. 1 according to certain embodiments. As shown in FIG. 2, segmented model training system 122 comprises multiple subsystems for generating and storing a SM. Segmented model training subsystem 122 comprises segment identification subsystem (SIS) 210. SIS 210 is a subsystem configured to receive conditional segment information such as segment conditions that will define segments in data according to segment attributes/values in the data. SIS 210 may receive segment information 200 defining the characteristics of segments to be identified in training data. For example, training data 131 in storage system 130 may be sent to segment identification subsystem to cause identification of one or more potential segments extractable from the training data 131. When implemented with an automated pipeline, SIS 210 may use segment information 200 to automatically determine attributes that can be utilized to build segmented models from training data 131. These attributes may be combined in multiple configurations, for example one-attribute segments, two-attribute segments, etc. SIS 210 may output segment identification information 202 corresponding to the identified segments of the training data.

Segmented model training subsystem 122 further comprises training data segmenter subsystem (TDSS) 212. TDSS 212 may use segment identification information 202 received from SIS 210 to identify one or more segments of training data 131, wherein each segment of training data comprises a number of training examples satisfying a segment condition specified by segment information 200. TDSS 212 may then generate segments of training data according to the identified segments to form segment training data 204. Segment training data 204 may comprise subsets of training data 131 (i.e. groupings of individual training examples) grouped according to one or more particular segment attributes identified by TDSS 212 and according to segment conditions in segment information 200. For example, TDSS 212 may receive training data 131 from storage system 130 and responsively cause generation of the segmented training data 204 based on segment identification information 202.

Segmented model training subsystem 122 further comprises sufficiency checker subsystem (SCS) 214. SCS 214 performs thresholds checks on segment training data 204 received from TDSS 212. The threshold checks determine whether one or more particular segments of training data in segment training data 204 meet a threshold condition for training a SM. For example, if segmented training data contains a number of training examples less than a threshold number, the segment of training data is not considered extensive enough to sufficiently train a SM. If SCS 214 determines that segmented training data is sufficient to generate a SM, the segment training data 204 may be forwarded from SCS 214 to a model generation subsystem. SCS 214 may also determine whether the segments of training data contain a sufficient number of objectives as ground truths for training a machine learning model. For example, even if enough training examples exist in a segmented training dataset to satisfy a numerical threshold, there may not be sufficient diversity of ground truths therein (i.e., all examples relate to fraudulent data) to sufficiently train a SM.

As depicted in FIG. 2, storage system 130 comprises segmentation settings 220. Segmentation settings 220 may be settings configurable by a user or administrator of model training system 120 to influence the manner in which segmented models are trained. Segmentation settings 220 comprise sufficiency settings 222 for setting some configurations/parameters for how SCS 214 may operate. For example, an administrator may create sufficiency settings 222 to comprise a threshold of sufficiency for a number of training examples that should be contained in segment training data 204 before a corresponding segmented model may be trained. These sufficiency settings 222 will be sent to SCS 214 to affect the manner in which SCS 214 ensures the segment training data 204 is sufficient.

Segmented model training subsystem 122 further comprises segmented model trainer/validation subsystem (SMTVS) 216. SMTVS 216 is a subsystem for generating and training SMs using segment-training data 204. For example, SMTVS 216 may receive segment training data 204 comprising segmented training data corresponding to a segment attribute. SMTVS 216 may determine that trained segmented models repository 140 does not contain a segmented model 142 corresponding to the segment attribute of the segmented training data. In response, SMTVS 216 may generate a new ML model which will be trained as a SM. SMTVS 216 may use segment training data 204 as input to train a model into a SM. Training of models to generate SMs may comprise using different training settings/parameters. For example, training settings 230 are stored on storage system 130. Training settings 230 comprise hyperparameters settings 232, which specify settings for training SMs using different configurations of hyperparameters as part of ML training techniques. One or more SMs may be generated by SMTVS 216 using different configurations of hyperparameters specified by hyperparameter settings 232. For example, even though two different SMs are trained using the same segment training data 204, each model may be trained using different hyperparameter settings 232, thus producing different SMs. In an embodiment, SMTVS 216 trains a plurality of SMs using different hyperparameter settings 232 and selects a particular SM of the plurality of SMs for forwarding. For example, SMTVS 216 may test a plurality of SMs trained using segmented training data 204 to determine a particular SM of the plurality of SMs that most frequently correctly predicts objectives of an input testing dataset.

SMTVS 216 may also validate models using a portion of the segment training data. The validation process may determine an accuracy score for the model once it has been trained. The accuracy score may represent a metric of validity as determined by SMTVS 216. For example, SMTVS 216 inputs a test dataset into the trained model to generate test outputs. The test outputs may then be compared to correct output data values to determine a degree of deviation between the outputs of the trained model and the correct output data values. The result, or a transformed version of the result, may be an accuracy score, or some other performance data. The trained SMs from SMTVS may be forwarded as Trained Segmented Model and Performance Data 206.

Segmented model training subsystem 122 further comprises segmented model evaluation subsystem (SMES) 218. SMES 218 is a subsystem for evaluating the performance of SMs trained by SMTVS 216 against a reference model, such as a GM. The evaluation may comprise inputting a testing dataset into each SM and a GM to receive segmented prediction data and global prediction data respectively. The segmented prediction data may be compared to the global prediction data to determine performance metrics of each prediction. If the segmented prediction data comprises metrics that are superior to the metrics of the global prediction data, the SM may be forwarded to trained segmented models repository 140 for storage. Trained models in trained segmented models repository 140 may then be forwarded to deployer 150 for deployment to a production environment. In an embodiment, the performance comparison between the global prediction data and the segmented prediction data is performed based on a user-configurable threshold (i.e., a user may specify a threshold difference between the performance metrics of the models which must be met or exceeded before the SM will be stored). As depicted in FIG. 2, segmentation settings 220 further comprises evaluation settings 224. Evaluation settings may be user or administrator configurable settings for performing the evaluation. For example, SMES 218 may receive evaluation settings 224 relating to configurations or parameters for performing segmented model evaluations that will be used to determine whether a trained SM will be stored or discarded.

FIG. 3 is a flowchart illustrating an example of a process for training a SM using segmented training data according to certain embodiments. The processing depicted in FIG. 3 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain alternative embodiments, the processing may be performed in some different order or some steps may also be performed in parallel. In certain embodiments, such as in the embodiment depicted in FIGS. 1 and 2, the processing depicted in FIG. 3 may be performed by segmented model training subsystem 122.

Process 300 may be initiated at 302, where segmented model training subsystem 122 receives a segment defining condition. A segment defining condition may be configured in a number of ways to define segmented training data. In some instances, as part of 302, a data scientist may specify one or more segment attributes (i.e., features) corresponding to attributes in a set of training data that will be used to segment the training data according to the embodiments described herein. In other embodiments, a machine-learning model or automated pipeline system may automatically select a segmenting condition corresponding to an attribute or group of attributes that will be used to segment the training data. For example, a segmenting condition may be received specifying that a set of training data will be segmented along attributional lines by city-of-origin of the training data.

At 304, the segment defining condition received in 302 is used to identify segmented training data including training examples that satisfy the segment defining condition. For example a SIS 210 of segmented model training subsystem 122 may receive segment information 200 in block 302 and use the segment defining condition in segment information 200 to identify training data satisfying the segment defining condition. Segmented data may be extracted from the training data which satisfy the segment defining condition. For example, a segment defining condition that specifies segmenting training data along attributional lines using a city-of-origin attribute may cause SIS 210 to generate pointer data as segment identification information 202 corresponding to the various identified subsets of training data which may be segmented. The identified segmented training data 204 is data segmented according to the segment defining condition potentially viable to train a SM.

At 306, a determination is made as to whether the segmented training data is sufficient to train an SM i.e., a determination is made as to whether the segmented training data satisfies a training criteria. Details pertaining to the training criteria are described next with reference to FIG. 4. The determination may comprise an analysis of the training examples comprised within the segmented training data to determine a metric of the segmented training data and may be performed by a SCS 214 of segmented model training subsystem 122. The metric may then be compared to a sufficiency threshold. For example a first sufficiency threshold may correspond to a number of training examples having an attribute required by the segment defining condition (i.e., do enough training examples come from the city-of-origin required by the segment defining condition). A second sufficiency threshold may correspond to a number of objective types/ground truth indicators of the training examples in the segmented training data (i.e., is the diversity of ground truths in the training data sufficient to train a SM model with an acceptable amount of bias). If it is determined that the segmented training data generated in 306 is not sufficient to train a SM, the process proceeds to 308, where segmented model training for the segment defining condition received in 302 is ended. If it is determined that the segmented training data generated in 306 is sufficient to train a SM, the segmented training data may be forwarded to another subsystem for model training.

At 310, a SM is trained using the segmented training data. The SM training may be performed by a SMTVS 216 in segmented model training subsystem 122. The training of the SM may comprise generating a new ML model which will be trained with the segmented training data generated in 306. Training the ML model may comprise defining one or more hyperparameters more the ML model and inputting the segmented training data to the ML model to begin training. Various hyperparameter configurations may be used as will be described with reference to FIG. 6. The result of the training process is the creation of Trained Segmented Model and Performance Data 206 which may be forwarded for evaluation to another subsystem.

At 312, the segmented model trained in 310 is validated and a performance metric(s) for the trained segmented model is determined. It is appreciated that the performance metric may be one of an accuracy metric, a recall metric, a precision metric, or a F1-score metric. It is appreciated that the accuracy metric may be defined as the proportion of true results among the total number of cases examined. The accuracy metric may be computed as follows: Accuracy= (TP+TN)/(TP+FP+FN+TN), where TP is true positives, TN is true negatives, FP is false positives, FN is false negatives, and TN is true negatives. The precision metric corresponds to a proportion of predicted positives being truly positives. Precision may be computed as: Precision=(TP)/(TP+FP). The recall metric is defined as a proportion of actual positives being correctly classified. The recall metric can be computed as: Recall=(TP)/(TP+FN). The F1-score metric is a weighted average of the recall metric and the precision metric. The SMTVS 216 may validate the model that it previously trained to determine one or more performance metrics relating to the performance of the model.

At 314, the SM trained in step 310 is evaluated based on the performance metrics determined in 312. Evaluation may comprise comparing the determined performance metrics in 312 to performance metrics of another model, such as a trained GM. Comparison may comprise determining whether one or more performance metrics of the trained SM model meet or exceed one or more performance metrics of a trained GM. The comparison may further comprise a threshold of performance relating to a number or percentage of performance metrics of the trained SM that exceed corresponding metrics of the trained GM.

At 316, it is determined whether the performance of the SM is better than the performance of a GM by a threshold. The determination may be based on the evaluation performed in 314. For example, if a number of performance metrics of the trained SM exceed corresponding performance metrics of the trained GM, the SM has performed better than the GM. If the SM does not perform better than the GM, the process continues to 308. At 318, if the SM performs better than the GM, the SM is saved/stored in a computer memory. Once the SM has been saved into memory, the process completes at 308.

Figure 4:
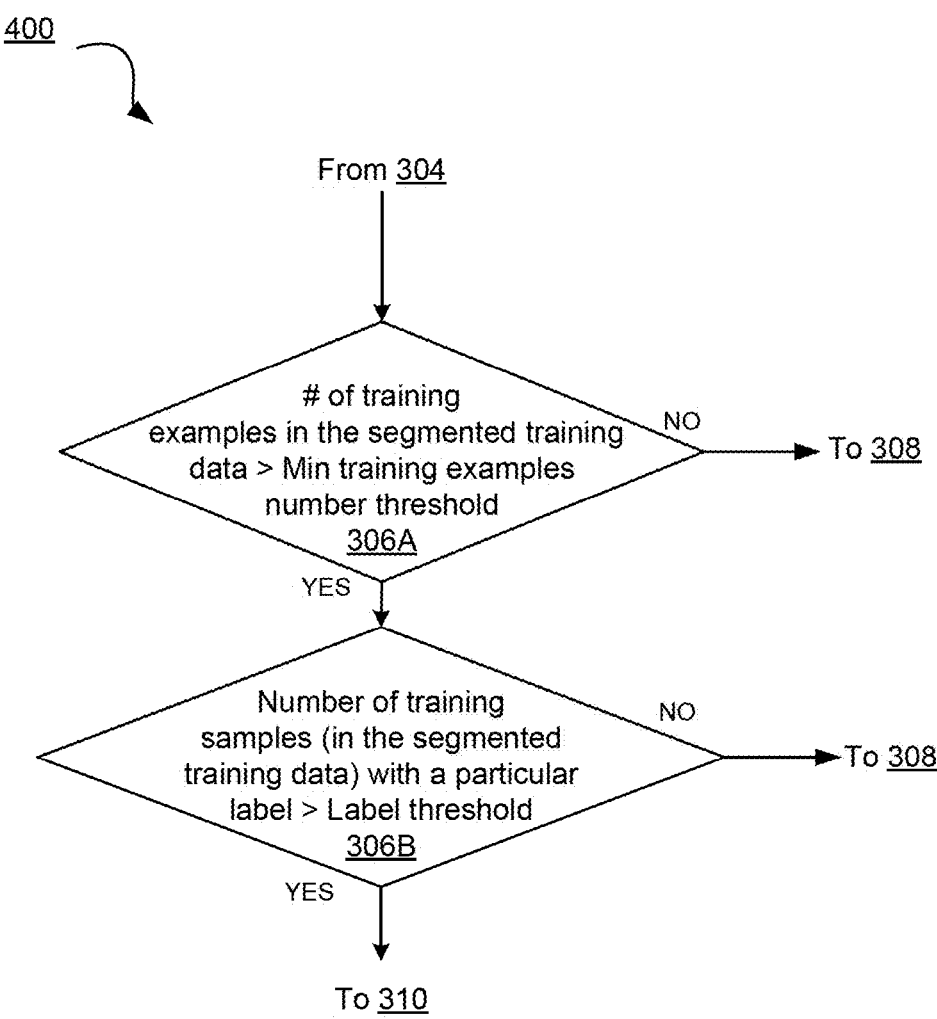
FIG. 4 is a flowchart illustrating an example process for ensuring sufficiency conditions required for segmented training data to be used in training segmented models according to certain embodiments.

FIG. 4 illustrates an example process for ensuring sufficiency of segmented training data used to train segmented models according to certain embodiments. Specifically, FIG. 4 illustrates the processing conducted in step 306 of FIG. 3 to determine whether segmented data satisfies training criteria in order to be used for training a segmented model. Process 400 begins once segmented training data based on the segment defining condition is identified and the segmented training data satisfies the segment defining condition (step 304 of FIG. 3).

At step 306A in FIG. 4, it is determined whether the number of training examples in the segmented training data is greater than a threshold number of training examples/ samples. The condition depicted in step 306A may correspond to a first criterion of the training criteria. If the response to the query in step 306A is affirmative, then the process moves to step 306B, else the process moves to step 308 of FIG. 3.

In step 306B of FIG. 4, it is determined whether the number of training samples (in the segmented training data) with a particular label is greater than a label threshold. This condition may correspond to a second criterion of the training criteria. The segmented training data may further comprise a number of particular training labels corresponding to some ground truth of a particular sample (set) of training data. For example, segmented training data may relate to a fraud-detection-based subset of training data and each set of the fraud-detection-based subset of training data may comprise one or two labels: fraudulent ground truth and non-fraudulent ground truth. An SM may require training on a certain distribution of ground truth labels to avoid training a model to product bias a production time. For example, an SM model trained using only fraudulent ground truth labelled training sampled will typically only predict input data to be fraudulent.

The number of training samples with a particular label may be compared to the label threshold to prevent biased training by determining that the segmented training data contains at least a minimum number of labelled data samples corresponding to a particular ground truth. For example, fraud-detection-based segmented training data may be required to contain a minimum of 5 "fraudulent" ground truth labelled samples of data and a minimum of 5 "non-fraudulent' ground truth labeled samples of data before it may be used to train an SM. If the response to the query in step 306B is affirmative, then the process moves to step 310 of FIG. 3. However, if the response to the query is negative, then the process moves to step 308 of FIG. 3.

Figure 5:
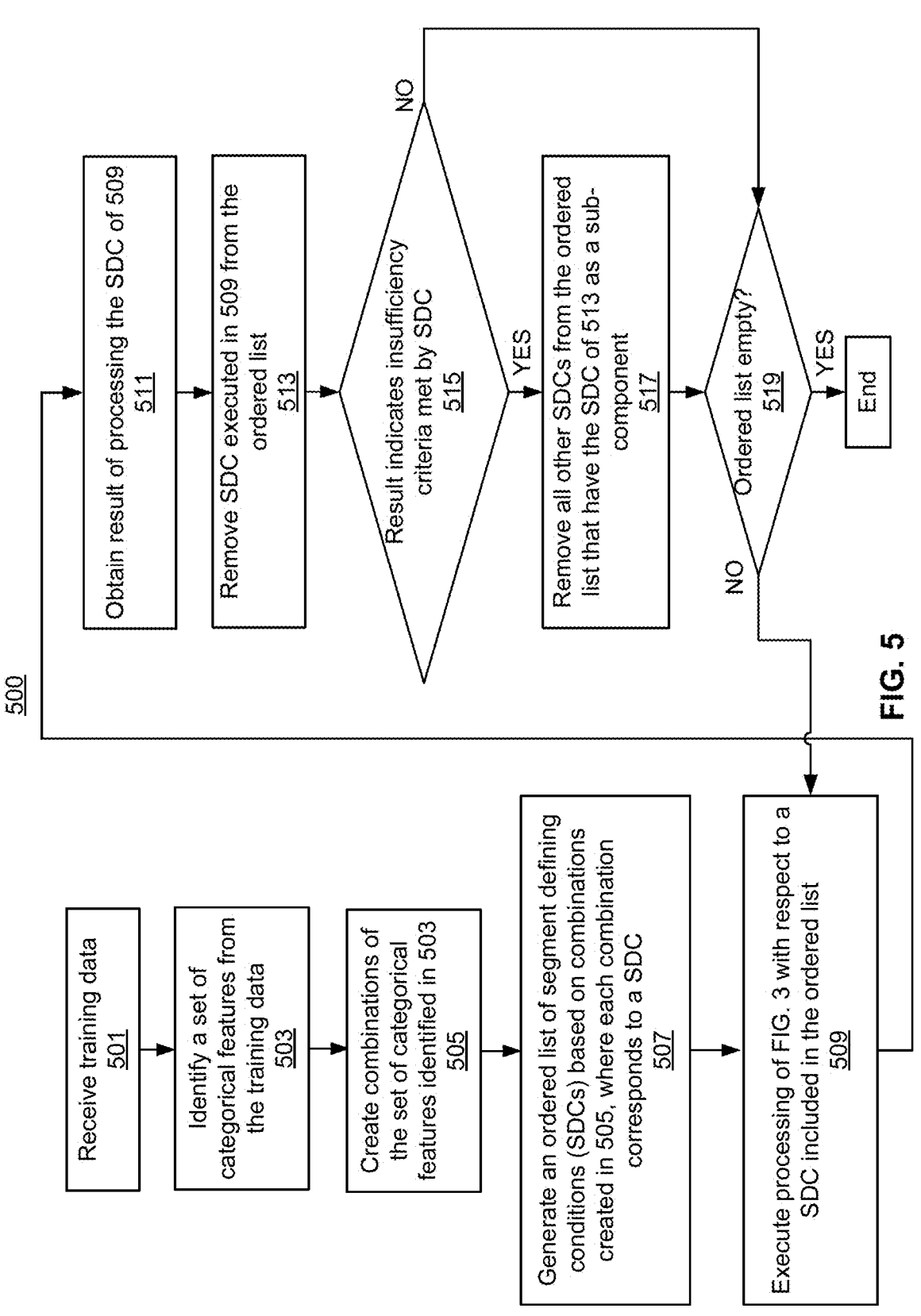
FIG. 5 is a flowchart illustrating steps performed by an automated pipeline in generating segmented models according to certain embodiments.

FIG. 5 is a flowchart illustrating steps performed by an automated pipeline in generating segmented models according to certain embodiments. The processing depicted in FIG. 5 may be implemented by the training environment 110 of FIG. 1 in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain alternative embodiments, the steps may be performed in some different order or some steps may also be performed in parallel.

The process commences in step 501, where training data is received. Based on the received training data, a set of categorical features are identified. For sake of illustration, assume that the set of categorical features includes three features i.e., the set of features is {A, B, C}. The process in step 505 creates combinations of the set of categorical features that are identified in step 503. For instance, with respect to the set of features{A, B, C}, the combinations generated in step 505 can correspond to {A}, {B}, {C}, {AB}, {AC}, {BC}, and {ABC}.

The process thereafter moves to step 507, where an ordered list of segment defining conditions is generated based on the combinations created in step 505. It is noted that each combination corresponds to a segment defining condition i.e., features included in a combination define the condition(s) for the particular segment. In one implementation, the ordered list may be generated based on an increasing order of broadness of the combination i.e., the most broad feature is included first in the list and the least board (i.e., most restrictive) combination is included last in the list. Accordingly, in one instance, the ordered list of segment defining conditions can be: ({A}, {B}, {C}, {AB}, {AC}, {BC}, and {ABC}).

The process in step 509 commences processing the ordered list of segment defining conditions. Specifically, each combination included in the ordered list is input to the process illustrated in FIG. 3. As described previously, it is noted that the output of the processing in FIG. 3 may result in either, storing a segmented model (corresponding to the input segment condition) based on a performance of the segmented model being better than the performance of a global model by a certain threshold (see step 316 of FIG. 3) or the segmented model may be discarded based on the performance of the segmented model not being greater than the performance of the global model by a certain threshold.

The result of processing a particular segment defining condition is obtained in step 511. In step 513, the segment defining condition processed in step 509 is removed from the ordered list of segment defining conditions. The process in step 515 executes a query to determine whether a result of processing the segment defining condition (of step 509) indicates an insufficiency criteria satisfied by the segment defining condition e.g., performance of the segmented model (corresponding to the segment defining condition) is lower than a performance of a global model. If the response to the query is affirmative, the process moves to step 517. If the response to the query is negative, then the process moves to step 519.

In step 517, all other segment defining conditions are removed from the ordered list that have the segment defining condition of step 513 as a sub-component. For example, consider that the combination executed in step 509 corresponds to the segment defining condition {C}. If the result of processing this segment defining condition (in step 515) indicates that the insufficiency criteria was met by {C} (i.e., performance of the segmented model (corresponding to the segment defining condition {C}) is lower than a performance of a global model), then all the following segment defining conditions:—{AC}, {BC}, and {ABC} are removed from the ordered list. This is done because, since segment defining condition {C} resulted in the insufficiency criteria, then the more restrictive segment defining conditions of {AC}, {BC}, and {ABC} are bound to satisfy the insufficiency criteria. In this manner, the process of FIG. 5 utilizes compute power in an efficient manner.

In response to the query in step 515 being negative, the process in step 519 executes a further query to determine whether the ordered list of segment defining conditions is empty. If the response to this query is negative, then the process loops back to step 509 to execute the processing with respect to the segment defining condition(s) that are still in the ordered list. However, if the response to the query (of step 519) is affirmative i.e., all segment defining conditions have been processed, then the process of FIG. 5 terminates. In this manner, a workflow/pipeline can automate the process of automatically generating segment defining conditions and processing the corresponding segmented models.

Figure 6:
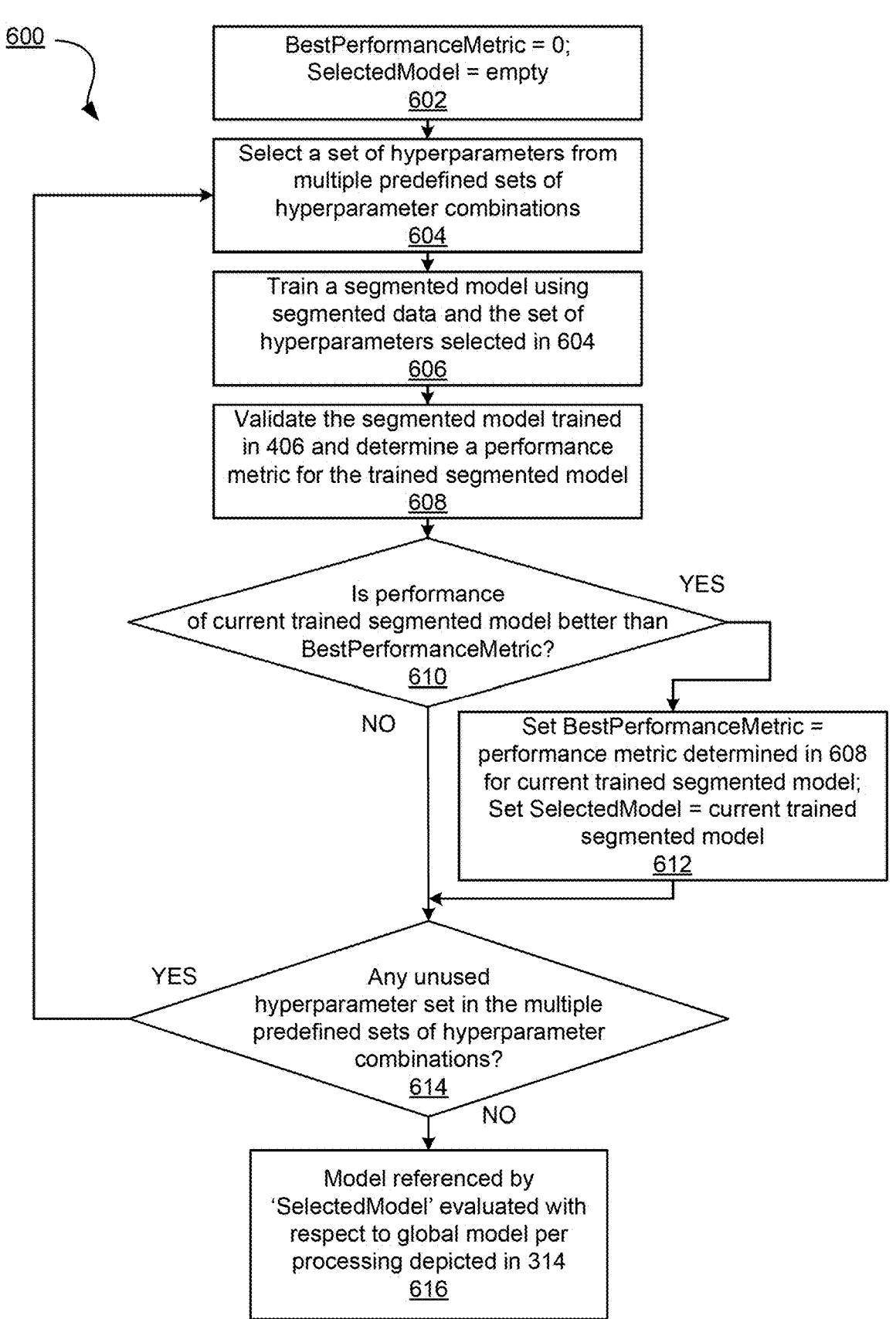
FIG. 6 is a flowchart illustrating a process for training segmented models using varied hyperparameter settings according to certain embodiments.

Turning now to FIG. 6 there is depicted a flowchart illustrating an example of a process for training SMs using varied hyperparameter settings according to certain embodiments. The processing depicted in FIG. 6 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 6 and described below is intended to be illustrative and non-limiting. Although FIG. 6 depicts the various processing steps occurring in a particular sequence or order, this is not intended to be limiting. In certain alternative embodiments, the processing may be performed in some different order or some steps may also be performed in parallel. In certain embodiments, such as in the embodiment depicted in FIGS. 1 and 2, the processing depicted in FIG. 6 may be performed by segmented model training subsystem 122.

Processing may be initiated at step 602, where a best performance metric is set to a value of zero and a selected model object is set to empty. For example, a numerically-based variable named 'BestPerformanceMetric' is initially set to a value of zero because no previous metrics have been determined. Similarly, a model-object-based variable named 'SelectedModel' is initially set to an empty/null value because no model has yet been selected.

At 604, a set of hyperparameters from multiple predefined sets of hyperparameter combinations are selected. The hyperparameter combinations relate to a number of hyperparameter combinations that may be used to train ML models. For example, an automated pipeline may specify a number of combinations of hyperparameter that may be used to train instances of an ML model using the same segmented training data to generate a plurality of SMs. The number of combinations may relate to a number of combinations/permutations of hyperparameters that may be used during training and may be selected as independent sets representing one or more subsets of all possible combinations/permutations of available hyperparameters. The selected sets of hyperparameters may be predefined, for example previously determined as preferred sets of hyperparameters for training a SM.

In step 606 a segmented model is trained using the segmented data and the set of hyperparameters selected in step 604. Thereafter, in step 608, the segmented model trained in 606 is validated, and a performance metric for the trained segmented model is determined. Validation of the trained SM may be similar to the validation process described in block 312 or FIG. 3. For example, a training set of data may be input to the trained SM to cause generation of output values by the trained SM. The output values may be compared to one or more known output values corresponding to the input testing data. The output values of the trained SM are compared to the known output values corresponding to the input test to determine a number of difference values. The difference values may be compiled and used to determine the performance metric for the trained SM. For example, the difference values determined may be compiled and a mean-value performance metric may be calculated.

At 610, it is determined if the performance of the current trained segmented model is better than the current 'BestPerformanceMetric'. If 'BestPerformanceMetric' is currently zero, the current trained segmented model is automatically better than the 'BestPerformanceMetric'. The determination may be based on a difference value determined based on the 'BestPerformanceMetric' and the performance metric determined in 608. For example, if the performance metric determined in 608 is larger than the 'BestPerformanceMetric', the current trained SM from the which performance metric is obtained is determined to be better than another model/performance metric from which the current 'BestPerformanceMetric' is derived.

If it is determined in 610 that the current trained segmented model is better than the 'BestPerformanceMetric', at 612, the 'BestPerformanceMetric' is set equal to the performance metric determined in 608 for the current trained segmented model. The variable 'SelectedModel' is also set equal to the current trained segmented model. This represents a replacement of any previous instance of performance metrics and models in the 'BestPerformanceMetric' and 'SelectedModel' variables respectively with the current performance metric and trained SM.

Subsequent to 612 or if it is determined in 610 that the performance of the current trained segmented model is not better than the 'BestPerformanceMetric', at 614, a determination is made as to whether any unused hyperparameter set in the multiple predefined sets of hyperparameter combinations exists. For example, an iterative determination may be made that each set of hyperparameters of the multiple predefined hyperparameter sets have been used to train an independent SM using the segmented training data. If there is at least one unused hyperparameters set, the process 600 proceeds to 604 where a new set of hyperparameters is selected from the multiple predefined sets of hyperparameter combinations.

If it is determined that there are no unused hyperparameters sets in the multiple predefined sets of hyperparameter combinations, at 616, the model currently referenced by 'SelectedModel' is evaluated with respect to a global model per processing described in step 314 of FIG. 3. The current model object represented by 'SelectedModel' may be compared to a trained GM. For example, the current 'BestPerformanceMetric' corresponding to the 'SelectedModel' may be compared to a performance metric of a trained GM to determine a difference value between the performance metric. The evaluation may comprise a determination based on the determined difference value. In this manner, a best SM is determined from among a plurality of SM models trained using the same segmented training data, but with different sets of hyperparameters from the multiple predefined hyperparameter combinations. This best SM will be compared to the trained GM.

In various embodiments not described in the figures, one or more scores of outputs of SM models may be combined to form a comprehensive metric. In various embodiments, multiple combinations and or permutations of variable categories may be combined manually or automatically to create one or more segmented machine-learning models according to the embodiments descried herein. In various embodiments, one or more hyperparameters comprised in machine-learning models may be modified prior to, during, or after training of a machine-learning model.

Figure 7A:
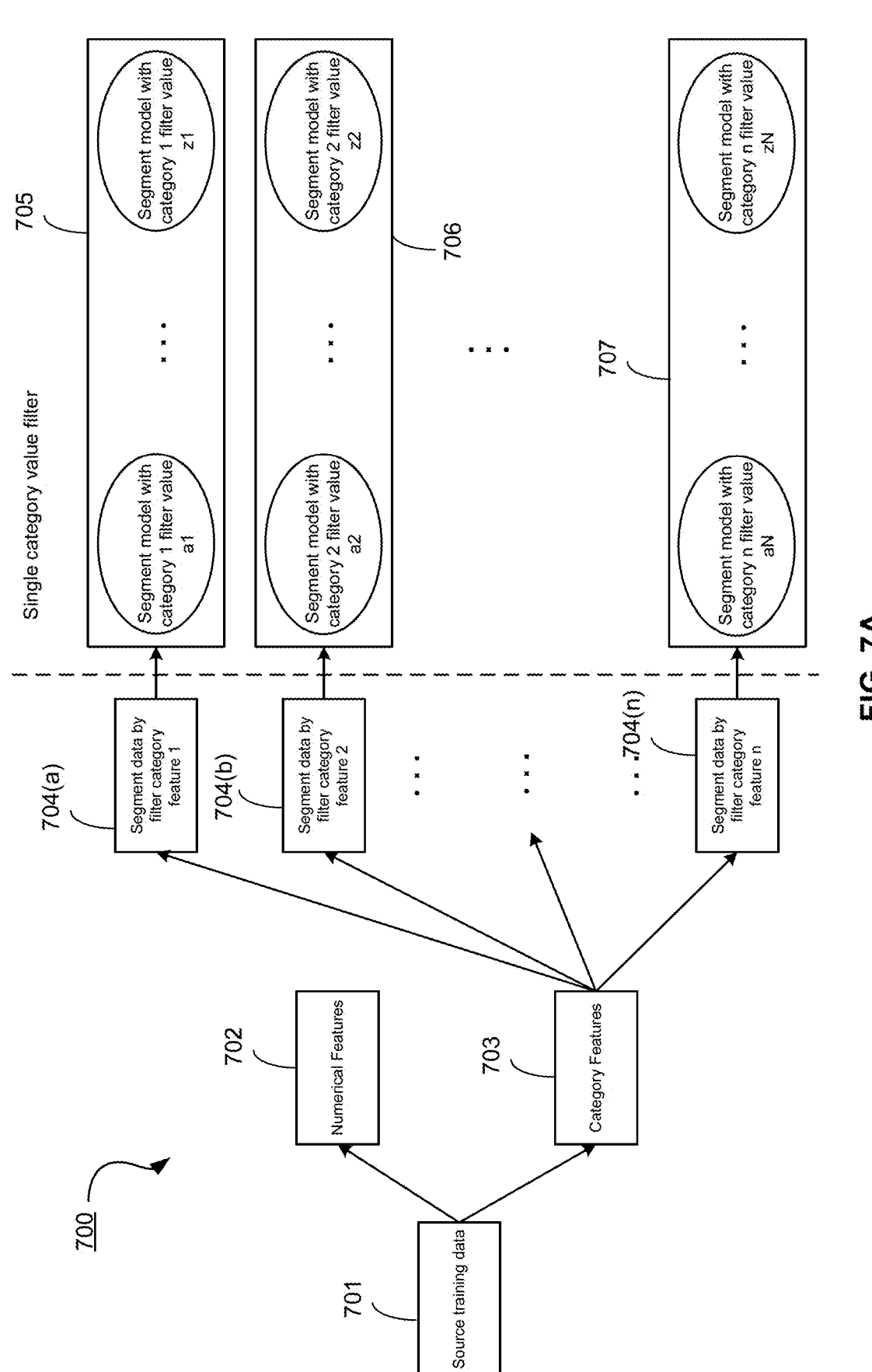
FIGS. 7A and 7B depict a block diagram illustrating generation of segmented models in an adaptive manner, according to certain embodiments.
Figure 7B:
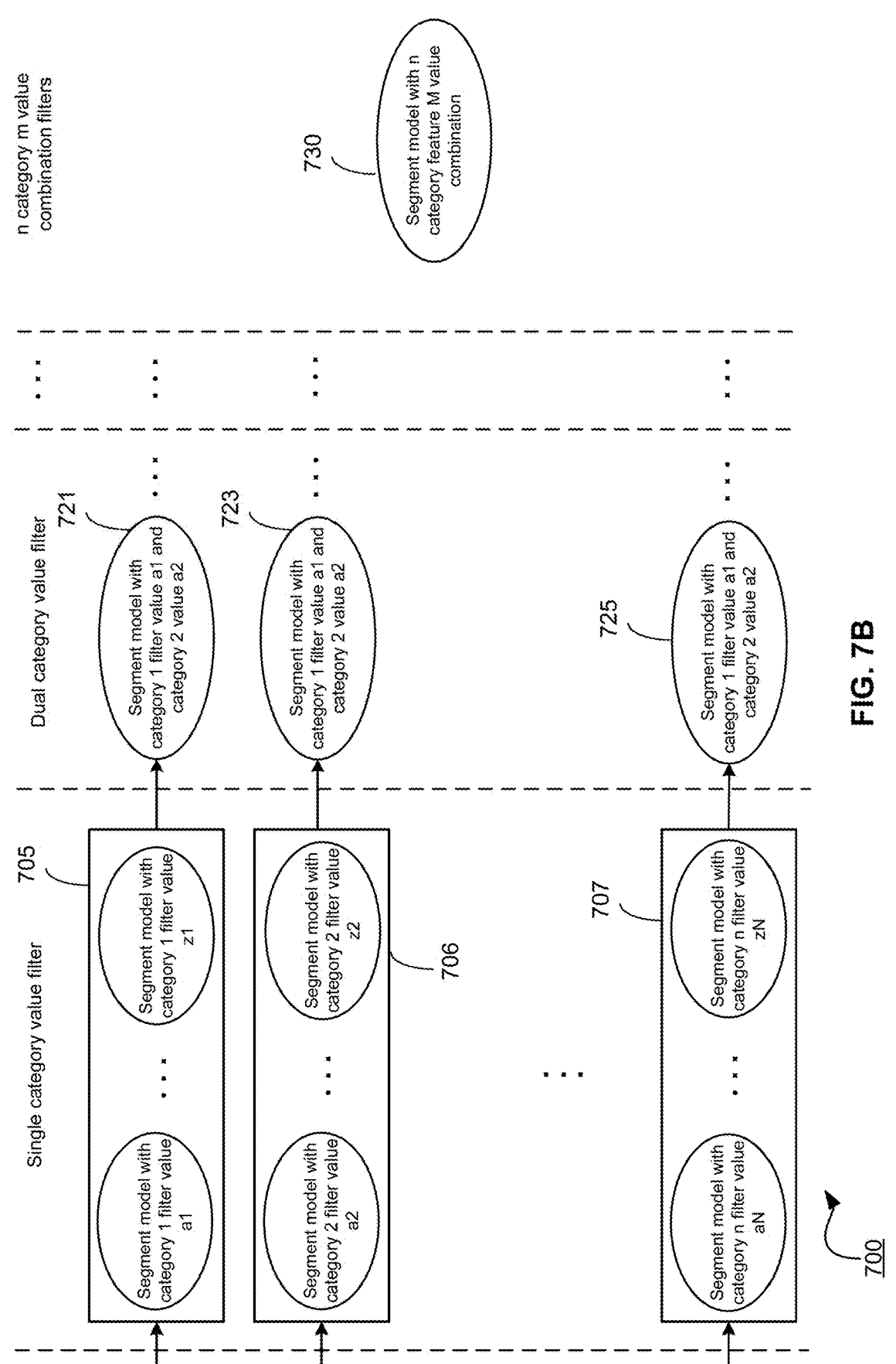

FIGS. 7A and 7B depict an exemplary scenario 700 of generating segmented data (and models thereof) in an adaptive manner, according to certain embodiments. As shown in FIG. 7A, training data 701 includes a plurality of features that can be classified as numerical features 702 and categorical features 703. In one implementation, categorical features 703 are utilized to segment training data into a plurality of segmented data based on the features included in the training data 701. For instance, as shown in FIG. 7A, 'n' segmented data portions (704(a), 704(b) . . . 704(n)) are obtained by segmenting the training data based on 'n' categorical features.

The data segmented categorical features (i.e., 704(a), 704(b) . . . 704(n)) may then be used to generate SMs with single categorical values. For instance, as shown in FIG. 7A, segmented data portion 704(a) may be utilized to generate SMs 705 having a single category value. In a similar manner, data portion 704(b) may be utilized to generate SMs 706 and data portion 704(n) may be utilized to generate SMs 710. Further as depicted in FIG. 7B, using the single categorical value SMs (i.e., 705, 706, and 710), one may generate multi categorical value SMs (e.g., dual categorical value SMs 721, 723, and 725). As depicted in FIG. 7B the combinations of SMs to form multi-categorical models are limited only by the number of segmentation categories that may be defined, culminating in a SM with N categorical features using M value combinations 730. Further, it is appreciated that at any stage depicted in FIG. 7A and FIG. 7B, a segmented model may be evaluated to determine if the segmented model performs better than the performance of the global model. Thereafter, if the segmented model performs better than the global model, the segmented model may be stored in a system storage (e.g. system storage 130 of FIG. 1).

Example Infrastructure as Service Architectures

In certain embodiments, the automated training data segmentation, training and validation of segmented models, evaluation of the segmented models to determine which ones to store, and the deployment and use of the segmented models in a production environment, may be offered as cloud services by a cloud services providers. In certain implementations, the services may be offered under a SaaS model. In some other implementations, the functionality may be offered as a cloud service by an IaaS service provider.

Figure 8:
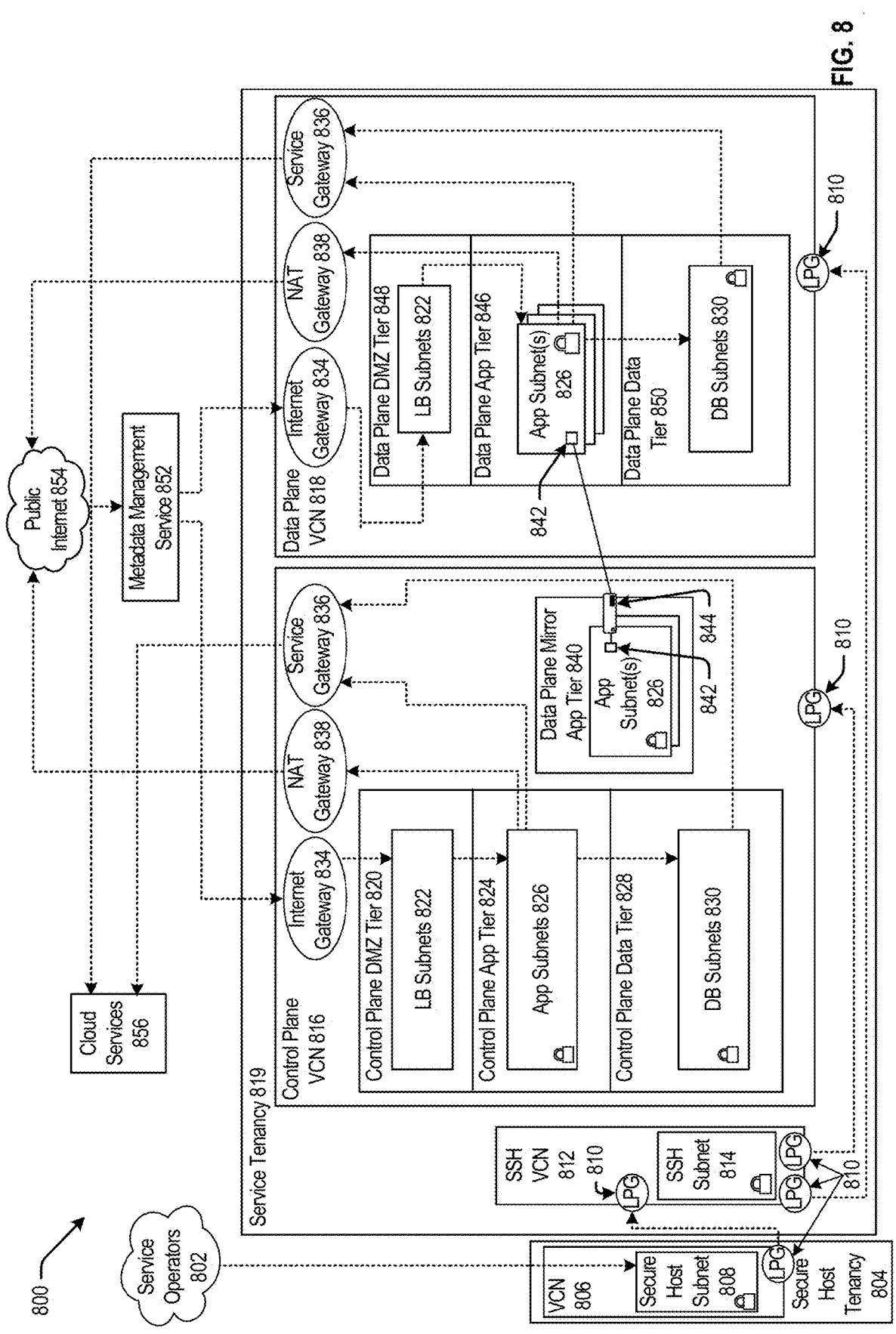
FIG. 8 is a block diagram illustrating one pattern for implementing a cloud infrastructure as a service system, according to at least one embodiment.

FIG. 8 depicts a system for performing processing related to segmented models in a cloud environment according to various embodiments. As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep security breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 may be communicatively coupled to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Memory that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of security, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
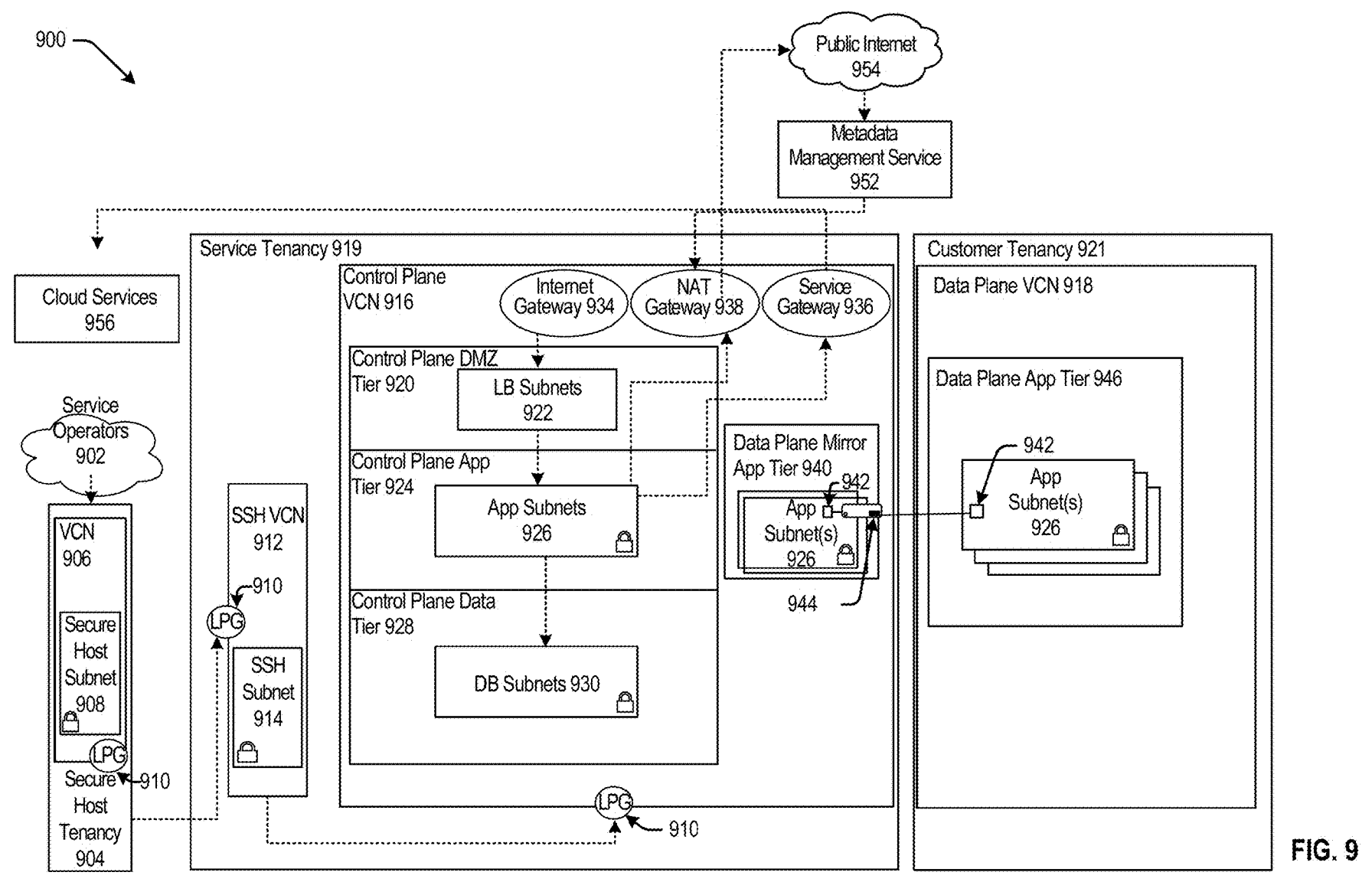

FIG. 9 is a block diagram 900 illustrating another example pattern of an IaaS architecture, according to at least one embodiment. Service operators 902 (e.g. service operators 802 of FIG. 8) can be communicatively coupled to a secure host tenancy 904 (e.g. the secure host tenancy 804 of FIG. 8) that can include a virtual cloud network (VCN) 906 (e.g. the VCN 806 of FIG. 8) and a secure host subnet 908 (e.g. the secure host subnet 808 of FIG. 8). The VCN 906 can include a local peering gateway (LPG) 910 (e.g. the LPG 810 of FIG. 8) that can be communicatively coupled to a secure shell (SSH) VCN 912 (e.g. the SSH VCN 812 of FIG. 8) via an LPG 810 contained in the SSH VCN 912. The SSH VCN 912 can include an SSH subnet 914 (e.g. the SSH subnet 814 of FIG. 8), and the SSH VCN 912 can be communicatively coupled to a control plane VCN 916 (e.g. the control plane VCN 816 of FIG. 8) via an LPG 910 contained in the control plane VCN 916. The control plane VCN 916 can be contained in a service tenancy 919 (e.g. the service tenancy 819 of FIG. 8), and the data plane VCN 918 (e.g. the data plane VCN 818 of FIG. 8) can be contained in a customer tenancy 921 that may be owned or operated by users, or customers, of the system.

The control plane VCN 916 can include a control plane DMZ tier 920 (e.g. the control plane DMZ tier 820 of FIG. 8) that can include LB subnet(s) 922 (e.g. LB subnet(s) 822 of FIG. 8), a control plane app tier 924 (e.g. the control plane app tier 824 of FIG. 8) that can include app subnet(s) 926 (e.g. app subnet(s) 826 of FIG. 8), a control plane data tier 928 (e.g. the control plane data tier 828 of FIG. 8) that can include database (DB) subnet(s) 930 (e.g. similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g. the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g. the service gateway of FIG. 8) and a network address translation (NAT) gateway 938 (e.g. the NAT gateway 838 of FIG. 8). The control plane VCN 916 can include the service gateway 936 and the NAT gateway 938.

The control plane VCN 916 can include a data plane mirror app tier 940 (e.g. the data plane mirror app tier 840 of FIG. 8) that can include app subnet(s) 926. The app subnet(s) 926 contained in the data plane mirror app tier 940 can include a virtual network interface controller (VNIC) 942 (e.g. the VNIC of 842) that can execute a compute instance 944 (e.g. similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g. the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g. the metadata management service 852 of FIG. 8) that can be communicatively coupled to public Internet 954 (e.g. public Internet 854 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g. cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918, but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
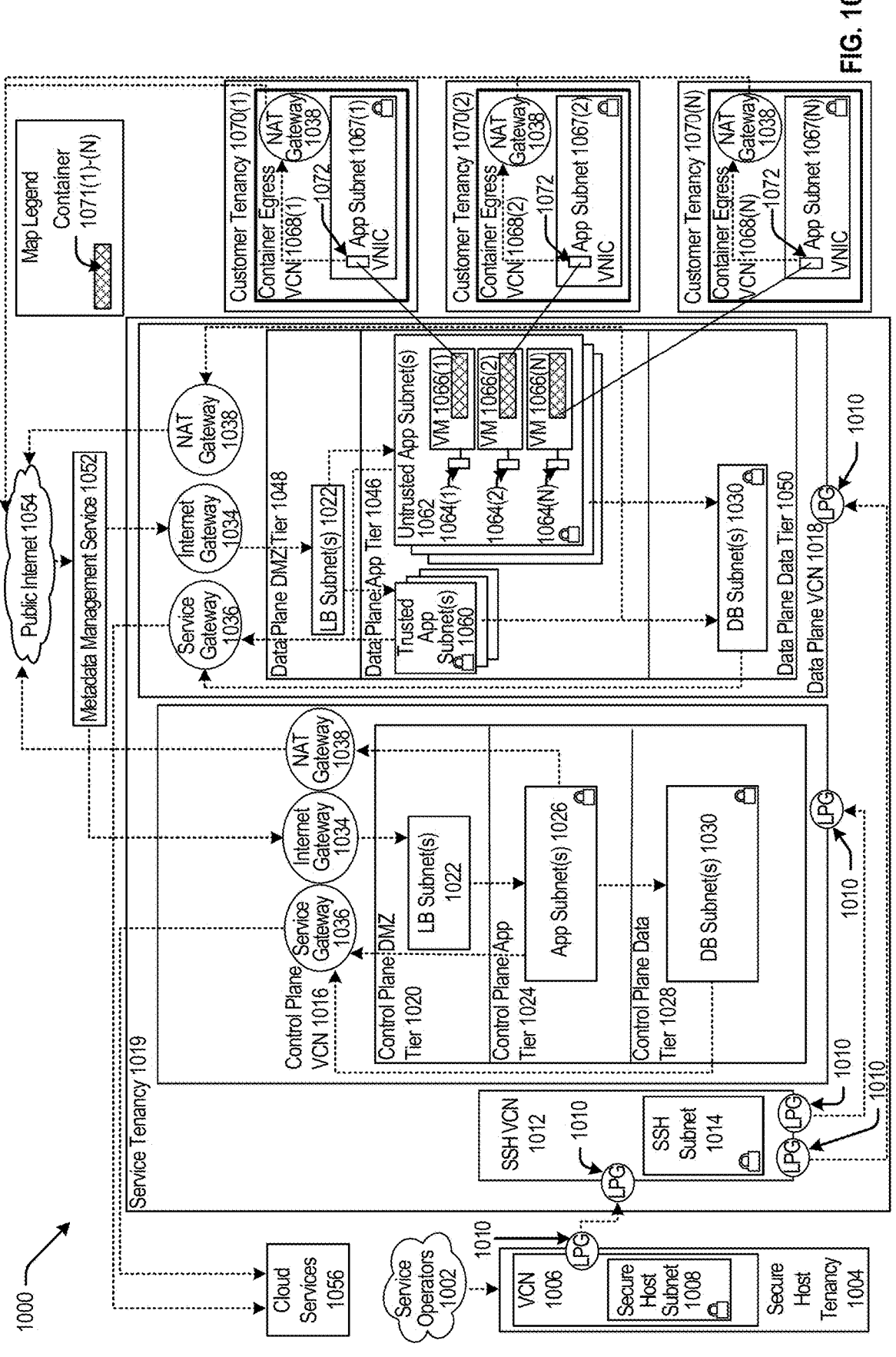
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 802 of FIG. 8) can be communicatively coupled to a secure host tenancy 1004 (e.g. the secure host tenancy 804 of FIG. 8) that can include a virtual cloud network (VCN) 1006 (e.g. the VCN 806 of FIG. 8) and a secure host subnet 1008 (e.g. the secure host subnet 808 of FIG. 8). The VCN 1006 can include an LPG 1010 (e.g. the LPG 810 of FIG. 8) that can be communicatively coupled to an SSH VCN 1012 (e.g. the SSH VCN 812 of FIG. 8) via an LPG 1010 contained in the SSH VCN 1012. The SSH VCN 1012 can include an SSH subnet 1014 (e.g. the SSH subnet 814 of FIG. 8), and the SSH VCN 1012 can be communicatively coupled to a control plane VCN 1016 (e.g. the control plane VCN 816 of FIG. 8) via an LPG 1010 contained in the control plane VCN 1016 and to a data plane VCN 1018 (e.g. the data plane 818 of FIG. 8) via an LPG 1010 contained in the data plane VCN 1018. The control plane VCN 1016 and the data plane VCN 1018 can be contained in a service tenancy 1019 (e.g. the service tenancy 819 of FIG. 8).

The control plane VCN 1016 can include a control plane DMZ tier 1020 (e.g. the control plane DMZ tier 820 of FIG. 8) that can include load balancer (LB) subnet(s) 1022 (e.g. LB subnet(s) 822 of FIG. 8), a control plane app tier 1024 (e.g. the control plane app tier 824 of FIG. 8) that can include app subnet(s) 1026 (e.g. similar to app subnet(s) 826 of FIG. 8), a control plane data tier 1028 (e.g. the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g. the service gateway of FIG. 8) and a network address translation (NAT) gateway 1038 (e.g. the NAT gateway 838 of FIG. 8). The control plane VCN 1016 can include the service gateway 1036 and the NAT gateway 1038.

The data plane VCN 1018 can include a data plane app tier 1046 (e.g. the data plane app tier 846 of FIG. 8), a data plane DMZ tier 1048 (e.g. the data plane DMZ tier 848 of FIG. 8), and a data plane data tier 1050 (e.g. the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g. public Internet 854 of FIG. 8).

The Internet gateway 1034 contained in the control plane VCN 1016 and contained in the data plane VCN 1018 can be communicatively coupled to a metadata management service 1052 (e.g. the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
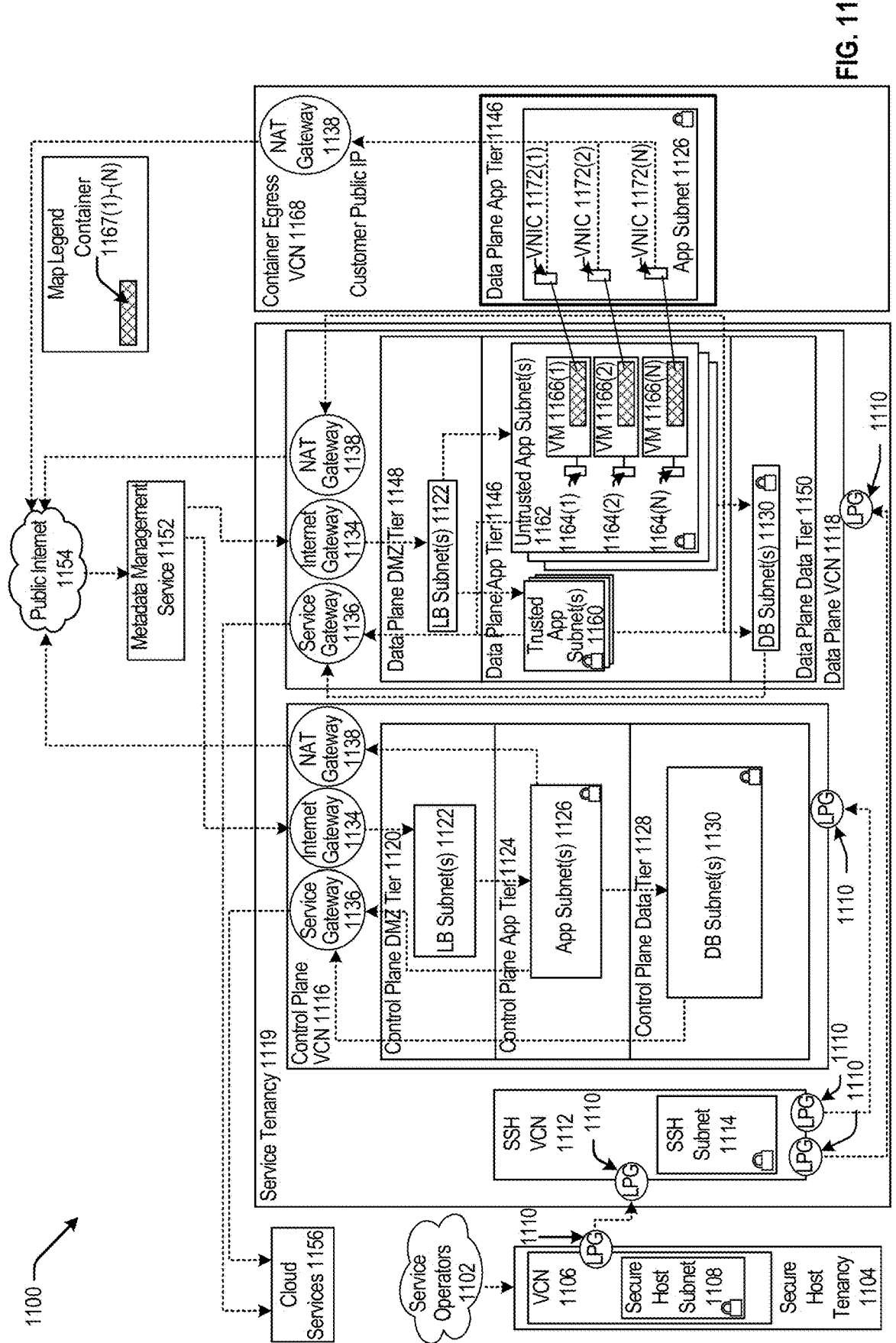
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g. service operators 802 of FIG. 8) can be communicatively coupled to a secure host tenancy 1104 (e.g. the secure host tenancy 804 of FIG. 8) that can include a virtual cloud network (VCN) 1106 (e.g. the VCN 806 of FIG. 8) and a secure host subnet 1108 (e.g. the secure host subnet 808 of FIG. 8). The VCN 1106 can include an LPG 1110 (e.g. the LPG 810 of FIG. 8) that can be communicatively coupled to an SSH VCN 1112 (e.g. the SSH VCN 812 of FIG. 8) via an LPG 1110 contained in the SSH VCN 1112. The SSH VCN 1112 can include an SSH subnet 1114 (e.g. the SSH subnet 814 of FIG. 8), and the SSH VCN 1112 can be communicatively coupled to a control plane VCN 1116 (e.g. the control plane VCN 816 of FIG. 8) via an LPG 1110 contained in the control plane VCN 1116 and to a data plane VCN 1118 (e.g. the data plane 818 of FIG. 8) via an LPG 1110 contained in the data plane VCN 1118. The control plane VCN 1116 and the data plane VCN 1118 can be contained in a service tenancy 1119 (e.g. the service tenancy 819 of FIG. 8).

The control plane VCN 1116 can include a control plane DMZ tier 1120 (e.g. the control plane DMZ tier 820 of FIG. 8) that can include LB subnet(s) 1122 (e.g. LB subnet(s) 822 of FIG. 8), a control plane app tier 1124 (e.g. the control plane app tier 824 of FIG. 8) that can include app subnet(s) 1126 (e.g. app subnet(s) 826 of FIG. 8), a control plane data tier 1128 (e.g. the control plane data tier 828 of FIG. 8) that can include DB subnet(s) 1130 (e.g. DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g. the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g. the service gateway of FIG. 8) and a network address translation (NAT) gateway 1138 (e.g. the NAT gateway 838 of FIG. 8). The control plane VCN 1116 can include the service gateway 1136 and the NAT gateway 1138.

The data plane VCN 1118 can include a data plane app tier 1146 (e.g. the data plane app tier 846 of FIG. 8), a data plane DMZ tier 1148 (e.g. the data plane DMZ tier 848 of FIG. 8), and a data plane data tier 1150 (e.g. the data plane data tier 850 of FIG. 8). The data plane DMZ tier 1148 can include LB subnet(s) 1122 that can be communicatively coupled to trusted app subnet(s) 1160 (e.g. trusted app subnet(s) 1060 of FIG. 10) and untrusted app subnet(s) 1162 (e.g. untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g. public Internet 854 of FIG. 8).

The Internet gateway 1134 contained in the control plane VCN 1116 and contained in the data plane VCN 1118 can be communicatively coupled to a metadata management service 1152 (e.g. the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate certain embodiments. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
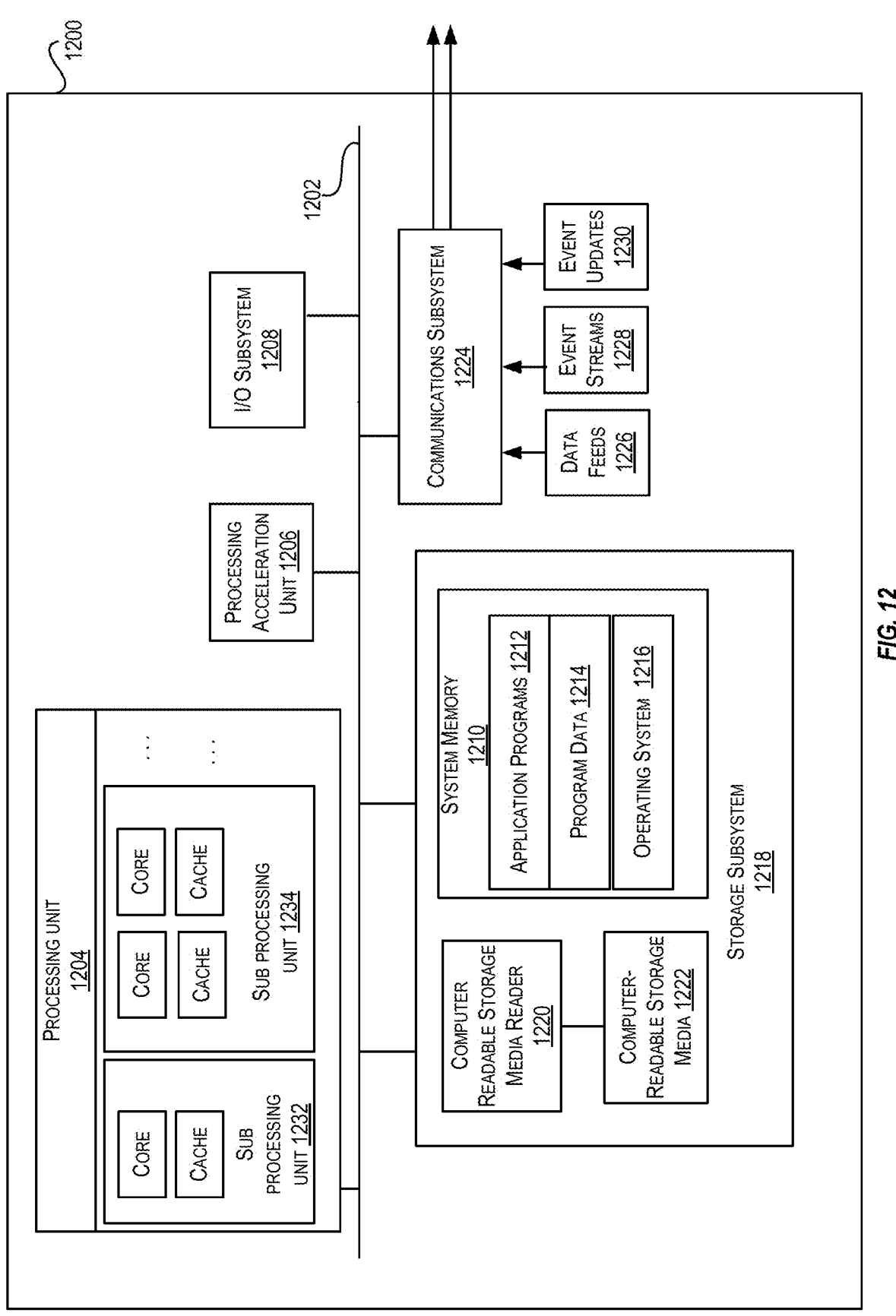
FIG. 12 is a block diagram illustrating an example computer system, according to at least one embodiment.

FIG. 12 illustrates an example computer system 1200, that may be used to implement various embodiments. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1232 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 12 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present disclosure.

Storage subsystem 1200 may also include a computer-readable storage media reader 1230 that can further be connected to computer-readable storage media 1232. Together and, optionally, in combination with system memory 1210, computer-readable storage media 1232 may comprehensively represent remote, local, fixed, and/or removable storage devices plus storage media for temporarily and/or more permanently containing, storing, transmitting, and retrieving computer-readable information.

Computer-readable storage media 1232 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1232 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1232 may include, but is not limited to, Zip® drives, flash memory cards, universal serial bus (USB) flash drives, secure digital (SD) cards, DVD disks, digital video tape, and the like. Computer-readable storage media 1232 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   for a segment-defining condition based on one or more features associated with a training dataset, identifying a subset of the training dataset that satisfies the segment-defining condition, wherein a number of training samples included in the subset of the training data set is less than the number of training samples included in the training dataset;
   training, in a model training environment, a machine-learning model using the subset of the training dataset to generate a trained segmented machine-learning model;
   evaluating a performance of the trained segmented machine-learning model with respect to a trained global machine learning model that is trained based on the training dataset;
   deploying the trained segmented machine-learning model and the trained global machine learning model in a production environment responsive to the performance of the trained segmented machine-learning model satisfying a condition; and
   responsive to receiving real time data in the production environment, executing the trained segmented machine learning model and the trained global machine learning model to generate a prediction with respect to the real time data, wherein the production environment is configured to transmit the prediction and the real time data to the machine-learning model executed in the training environment.

2. The method of claim 1, further comprising:
   determining whether the subset of the training dataset satisfies a training criteria; and
   responsive to the subset of the training dataset satisfying the training criteria, executing the training of the machine-learning model using the subset of the training dataset to generate the trained segmented machine-learning model.

3. The method of claim 2, wherein the training criteria includes a first criterion corresponding to determining whether the number of training samples included in the subset of the training dataset is greater than a first threshold number of training samples.

4. The method of claim 2, wherein the training criteria includes a second criterion corresponding to determining whether the number of training samples included in the subset of the training dataset having a particular label is greater than a second threshold number of training samples associated with the particular label.

5. The method of claim 1, wherein the performance of the trained segmented machine-learning model and the trained global machine learning model is evaluated based on a metric, the metric being one of an accuracy metric, a recall metric, a precision metric, or an F1-score metric.

6. The method of claim 1, wherein the step of evaluating the performance of the trained segmented machine-learning model and the trained global machine learning model further comprises:
   determining whether the performance of the trained segmented machine-learning model exceeds the performance of the trained global machine learning model by a predetermined threshold; and
   storing the trained segmented machine-learning model in response to a successful determination.

7. The method of claim 1, wherein the training the machine-learning model using the subset of the training dataset further comprises:
   generating a plurality of machine-learning models based on a set of hyperparameters, wherein each of the plurality of machine-learning models is associated with a unique setting of the set of hyperparameters.

8. The method of claim 7, further comprising:

training each machine-learning model of the plurality of machine-learning models using the subset of the training dataset;

evaluating a performance of each machine-learning model of the plurality of machine-learning models based on a metric; and selecting, based on the evaluating, one of the plurality of machine-learning models to be the trained segmented machine-learning model.

9. A non-transitory computer readable medium storing specific computer-executable instructions that, when executed by a processor, cause a computer system to perform operations comprising:

for a segment-defining condition based on one or more features associated with a training dataset, identifying a subset of the training dataset that satisfies the segment-defining condition, wherein a number of training samples included in the subset of the training data set is less than the number of training samples included in the training dataset;

training, in a model training environment, a machine-learning model using the subset of the training dataset to generate a trained segmented machine-learning model;

evaluating a performance of the trained segmented machine-learning model with respect to a trained global machine learning model that is trained based on the training dataset;

deploying the trained segmented machine-learning model and the trained global machine learning model in a production environment responsive to the performance of the trained segmented machine-learning model satisfying a condition; and responsive to receiving real time data in the production environment, executing the trained segmented machine learning model and the trained global machine learning model to generate a prediction with respect to the real time data, wherein the production environment is configured to transmit the prediction and the real time data to the machine-learning model executed in the training environment.

10. The non-transitory computer readable medium storing specific computer-executable instructions of claim 9, further comprising:

determining whether the subset of the training dataset satisfies a training criteria; and responsive to the subset of the training dataset satisfying the training criteria, executing the training of the machine-learning model using the subset of the training dataset to generate the trained segmented machine-learning model.

11. The non-transitory computer readable medium storing specific computer-executable instructions of claim 10, wherein the training criteria includes a first criterion corresponding to determining whether the number of training samples included in the subset of the training dataset is greater than a first threshold number of training samples.

12. The non-transitory computer readable medium storing specific computer-executable instructions of claim 10, wherein the training criteria includes a second criterion corresponding to determining whether the number of training samples included in the subset of the training dataset having a particular label is greater than a second threshold number of training samples associated with the particular label.

13. The non-transitory computer readable medium storing specific computer-executable instructions of claim 9, wherein the performance of the trained segmented machine-learning model and the trained global machine learning model is evaluated based on a metric, the metric being one of an accuracy metric, a recall metric, a precision metric, or an F1-score metric.

14. A computing device comprising:

a processor; and a memory including instructions that, when executed with the processor, cause the computing device to, at least:

for a segment-defining condition based on one or more features associated with a training dataset, identify a subset of the training dataset that satisfies the segment-defining condition, wherein a number of training samples included in the subset of the training data set is less than the number of training samples included in the training dataset;

train, in a model training environment, a machine-learning model using the subset of the training dataset to generate a trained segmented machine-learning model;

evaluate a performance of the trained segmented machine-learning model with respect to a trained global machine learning model that is trained based on the training dataset;

deploy the trained segmented machine-learning model and the trained global machine learning model in a production environment responsive to the performance of the trained segmented machine-learning model satisfying a condition; and responsive to receiving real time data in the production environment, execute the trained segmented machine learning model and the trained global machine learning model to generate a prediction with respect to the real time data, wherein the production environment is configured to transmit the prediction and the real time data to the machine-learning model executed in the training environment.

15. The computing device of claim 14, further configured to:

determine whether the subset of the training dataset satisfies a training criteria; and responsive to the subset of the training dataset satisfying the training criteria, train the machine-learning model using the subset of the training dataset to generate the trained segmented machine-learning model.

16. The computing device of claim 15, wherein the training criteria includes a first criterion corresponding to determining whether the number of training samples included in the subset of the training dataset is greater than a first threshold number of training samples.

17. The computing device of claim 15, wherein the training criteria includes a second criterion corresponding to determining whether the number of training samples included in the subset of the training dataset having a particular label is greater than a second threshold number of training samples associated with the particular label.

18. The computing device of claim 14, wherein the performance of the trained segmented machine-learning model and the trained global machine learning model is evaluated based on a metric, the metric being one of an accuracy metric, a recall metric, a precision metric, or an F1-score metric.

19. The computing device of claim 14, further configured to:

generate a plurality of machine-learning models based on a set of hyperparameters, wherein each of the plurality of machine-learning models is associated with a unique setting of the set of hyperparameters.

20. The computing device of claim 14, wherein the computing device is configured to train the machine-learning model using the subset of the training dataset by generating a plurality of machine-learning models based on a set of hyperparameters, wherein each of the plurality of machine-learning models is associated with a unique setting of the set of hyperparameters.

\* \* \* \* \*